US009483911B2

(12) United States Patent
Backover et al.

(10) Patent No.: US 9,483,911 B2
(45) Date of Patent: Nov. 1, 2016

(54) INFORMATION DISTRIBUTION IN GAMING NETWORKS

(75) Inventors: Marty Backover, Las Vegas, NV (US); Sean Bybee, Mays Landing, NJ (US); Rajendra Chaparala, Chennai (IN); David Corson, Mays Landing, NJ (US); Ignatius Vincent, Nagercoil (IN); Patricia McMahan, Vineland, NJ (US); Subbarrao Panindra, Bangalore (IN); Mukundhan Srinivasan, Marietta, GA (US); Alexandra Taylor, Egg Harbor Township, NJ (US)

(73) Assignee: BALLY GAMING, INC., Las Vegas, NV (US)

( * ) Notice: Subject to any disclaimer, the term of this patent is extended or adjusted under 35 U.S.C. 154(b) by 1707 days.

(21) Appl. No.: 12/112,691

(22) Filed: Apr. 30, 2008

(65) Prior Publication Data

US 2009/0275402 A1 Nov. 5, 2009

(51) Int. Cl.
*A63F 13/00* (2014.01)
*G06F 15/16* (2006.01)
*G07F 17/32* (2006.01)

(52) U.S. Cl.
CPC ....... *G07F 17/3248* (2013.01); *G07F 17/3232* (2013.01); *G07F 17/3237* (2013.01); *G07F 17/3239* (2013.01)

(58) Field of Classification Search
CPC ........ A63F 13/12; A63F 13/35; A63F 13/70; A63F 13/79; G07F 17/32; G07F 17/3225; G07F 17/3232; G07F 17/3237; G07F 17/3239
USPC ........................................................... 463/43
See application file for complete search history.

(56) References Cited

U.S. PATENT DOCUMENTS

| | | | | |
|---|---|---|---|---|
| 4,339,798 | A | 7/1982 | Hedges et al. | |
| 4,373,726 | A | 2/1983 | Churchill et al. | 273/138 A |
| 4,592,377 | A | 6/1986 | Paulsen et al. | 133/5 R |
| 4,725,079 | A | 2/1988 | Koza et al. | 283/73 |
| 4,832,341 | A | 5/1989 | Muller et al. | 273/139 |
| 4,948,138 | A | 8/1990 | Pease et al. | 273/138 A |
| 5,007,649 | A | 4/1991 | Richardson | |
| 5,083,800 | A | 1/1992 | Lockton | 273/439 |
| 5,179,517 | A | 1/1993 | Sarbin et al. | 364/410 |
| 5,199,710 | A | 4/1993 | Lamle | 273/149 R |

(Continued)

FOREIGN PATENT DOCUMENTS

| | | |
|---|---|---|
| DE | 199 40 954 A1 | 1/2001 |
| EP | 1 074 955 A2 | 2/2001 |

(Continued)

OTHER PUBLICATIONS

Dick Lewis, The 12 Commandments of File Sharing, Windows IP Pro (Apr. 26, 2004), http://windowsitpro.com/security/12-commandments-file-sharing.*

(Continued)

*Primary Examiner* — Lawrence Galka
(74) *Attorney, Agent, or Firm* — Seed IP Law Group PLLC

(57) ABSTRACT

Patron information generated at an originating gaming property may be transmitted to a requesting gaming property based on a set of permissions associated with a group of gaming properties. Vouchers generated at a first gaming property may also be redeemed at a second gaming property.

19 Claims, 9 Drawing Sheets

(56) References Cited

U.S. PATENT DOCUMENTS

| | | | | |
|---|---|---|---|---|
| 5,258,837 | A | 11/1993 | Gormley | 358/140 |
| 5,275,400 | A | 1/1994 | Weingardt et al. | 273/85 CP |
| 5,321,241 | A | 6/1994 | Craine | |
| 5,324,035 | A | 6/1994 | Morris et al. | 273/138 A |
| 5,326,104 | A | 7/1994 | Pease et al. | 273/138 A |
| 5,386,103 | A | 1/1995 | DeBan et al. | 235/379 |
| 5,398,932 | A | 3/1995 | Eberhardt et al. | 273/138 A |
| 5,472,194 | A | 12/1995 | Breeding et al. | 273/138 A |
| 5,493,613 | A | 2/1996 | Denno et al. | |
| 5,505,449 | A | 4/1996 | Eberhardt et al. | 273/138 A |
| 5,507,489 | A | 4/1996 | Reibel et al. | 273/138 A |
| 5,562,284 | A | 10/1996 | Stevens | 273/139 |
| 5,580,311 | A | 12/1996 | Haste, III | 463/29 |
| 5,605,334 | A | 2/1997 | McCrea, Jr. | 273/309 |
| 5,605,506 | A | 2/1997 | Hoorn et al. | 463/47 |
| 5,613,680 | A | 3/1997 | Groves et al. | 273/138.2 |
| 5,613,912 | A | 3/1997 | Slater | 463/25 |
| 5,643,086 | A | 7/1997 | Alcorn et al. | 463/29 |
| 5,655,961 | A | 8/1997 | Acres et al. | 463/27 |
| 5,707,287 | A | 1/1998 | McCrea, Jr. | 463/27 |
| 5,737,418 | A | 4/1998 | Saffari et al. | 380/9 |
| 5,741,183 | A | 4/1998 | Acres et al. | 463/42 |
| 5,745,110 | A | 4/1998 | Ertemalp | |
| 5,759,102 | A | 6/1998 | Pease et al. | 463/42 |
| 5,770,533 | A | 6/1998 | Franchi | 463/42 |
| 5,779,545 | A | 7/1998 | Berg et al. | 463/22 |
| 5,800,268 | A | 9/1998 | Molnick | |
| 5,813,912 | A | 9/1998 | Shultz | 463/25 |
| 5,823,879 | A | 10/1998 | Goldberg et al. | 463/42 |
| 5,830,067 | A | 11/1998 | Graves et al. | 463/40 |
| 5,830,068 | A | 11/1998 | Brenner et al. | 463/42 |
| 5,848,426 | A | 12/1998 | Wang et al. | |
| 5,850,447 | A | 12/1998 | Peyret | 380/25 |
| 5,851,149 | A | 12/1998 | Xidos et al. | |
| 5,890,963 | A | 4/1999 | Yen | 463/42 |
| 5,895,451 | A | 4/1999 | Yamade et al. | |
| 5,905,847 | A | 5/1999 | Kobayashi et al. | |
| 5,911,626 | A | 6/1999 | McCrea, Jr. | 463/27 |
| 5,957,776 | A | 9/1999 | Hoehne | 463/25 |
| 5,971,851 | A | 10/1999 | Pascal et al. | 463/24 |
| 5,974,135 | A | 10/1999 | Breneman et al. | |
| 5,999,808 | A | 12/1999 | LaDue | 455/412 |
| 6,001,016 | A | 12/1999 | Walker et al. | 463/42 |
| 6,042,150 | A | 3/2000 | Daley | 283/86 |
| 6,047,322 | A | 4/2000 | Vaid et al. | |
| 6,068,553 | A | 5/2000 | Parker | 463/27 |
| 6,077,161 | A | 6/2000 | Wisler | 463/11 |
| 6,080,063 | A | 6/2000 | Khosla | 463/42 |
| 6,089,980 | A | 7/2000 | Gauselmann | 463/27 |
| 6,093,103 | A | 7/2000 | McCrea, Jr. | 463/27 |
| 6,102,799 | A | 8/2000 | Stupak | 463/27 |
| 6,104,815 | A | 8/2000 | Alcorn et al. | 380/251 |
| 6,106,396 | A | 8/2000 | Alcorn et al. | 463/29 |
| 6,110,041 | A | 8/2000 | Walker et al. | 463/20 |
| 6,110,043 | A | 8/2000 | Olsen | 463/27 |
| 6,117,012 | A | 9/2000 | McCrea, Jr. | 463/27 |
| 6,135,887 | A | 10/2000 | Pease et al. | 463/42 |
| 6,146,273 | A | 11/2000 | Olsen | 463/27 |
| 6,149,522 | A | 11/2000 | Alcorn et al. | 463/29 |
| 6,152,824 | A | 11/2000 | Rothschild et al. | 463/42 |
| 6,165,069 | A | 12/2000 | Sines et al. | 463/12 |
| 6,166,763 | A | 12/2000 | Rhodes et al. | 348/143 |
| 6,168,523 | B1 | 1/2001 | Piechowiak et al. | 463/26 |
| 6,183,366 | B1 | 2/2001 | Goldberg et al. | 463/42 |
| 6,185,184 | B1 | 2/2001 | Mattaway et al. | |
| 6,186,892 | B1 | 2/2001 | Frank et al. | 463/19 |
| 6,210,277 | B1 | 4/2001 | Stefan | 463/27 |
| 6,217,447 | B1 | 4/2001 | Lofink et al. | 463/12 |
| 6,219,836 | B1 | 4/2001 | Wells et al. | 717/11 |
| 6,234,898 | B1 | 5/2001 | Belamant et al. | 463/25 |
| 6,244,958 | B1 | 6/2001 | Acres | 463/26 |
| 6,251,014 | B1 | 6/2001 | Stockdale et al. | 463/16 |
| 6,254,483 | B1 | 7/2001 | Acres | |
| 6,254,484 | B1 | 7/2001 | McCrea, Jr. | 463/27 |
| 6,256,651 | B1 | 7/2001 | Tuli | |
| 6,264,561 | B1 | 7/2001 | Saffari et al. | 463/42 |
| 6,275,586 | B1 | 8/2001 | Kelly | 380/46 |
| 6,287,202 | B1 | 9/2001 | Pascal et al. | 463/42 |
| 6,302,793 | B1 | 10/2001 | Fertitta, III et al. | |
| 6,312,332 | B1 | 11/2001 | Walker et al. | |
| 6,319,125 | B1 | 11/2001 | Acres | |
| 6,346,044 | B1 | 2/2002 | McCrea, Jr. | 463/27 |
| 6,362,836 | B1 | 3/2002 | Shaw et al. | |
| 6,363,509 | B1 | 3/2002 | Parulkar et al. | |
| 6,380,953 | B1 | 4/2002 | Mizuno | |
| 6,383,076 | B1 | 5/2002 | Tiedeken | 463/40 |
| 6,389,126 | B1 | 5/2002 | Bjornberg et al. | |
| 6,394,900 | B1 | 5/2002 | McGlone et al. | 463/20 |
| 6,400,272 | B1 | 6/2002 | Holtzman et al. | 340/572.1 |
| 6,401,099 | B1 | 6/2002 | Koppolu et al. | |
| 6,409,602 | B1 | 6/2002 | Wiltshire et al. | 463/42 |
| 6,439,996 | B2 | 8/2002 | LeMay et al. | 463/29 |
| 6,443,839 | B2 | 9/2002 | Stockdale et al. | 463/16 |
| 6,459,882 | B1 | 10/2002 | Palermo et al. | |
| 6,460,848 | B1 | 10/2002 | Soltys et al. | 273/149 R |
| 6,464,584 | B2 | 10/2002 | Oliver | 463/25 |
| 6,488,581 | B1 | 12/2002 | Stockdale | 463/29 |
| 6,488,585 | B1 | 12/2002 | Wells et al. | 463/43 |
| 6,490,285 | B2 | 12/2002 | Lee et al. | |
| 6,503,147 | B1 | 1/2003 | Stockdale et al. | 463/29 |
| 6,505,772 | B1 | 1/2003 | Mollett et al. | 235/379 |
| 6,508,709 | B1 | 1/2003 | Karmarkar | 463/42 |
| 6,508,710 | B1 | 1/2003 | Paravia et al. | 463/42 |
| 6,516,350 | B1 | 2/2003 | Lumelsky et al. | |
| 6,517,435 | B2 | 2/2003 | Soltys et al. | 463/25 |
| 6,517,436 | B2 | 2/2003 | Soltys et al. | 463/29 |
| 6,520,857 | B2 | 2/2003 | Soltys et al. | 463/29 |
| 6,527,271 | B2 | 3/2003 | Soltys et al. | 273/148 R |
| 6,527,638 | B1 | 3/2003 | Walker et al. | |
| 6,530,836 | B2 | 3/2003 | Soltys et al. | 463/29 |
| 6,530,837 | B2 | 3/2003 | Soltys et al. | 463/29 |
| 6,533,276 | B2 | 3/2003 | Soltys et al. | 273/148 R |
| 6,533,662 | B2 | 3/2003 | Soltys et al. | 463/25 |
| 6,575,833 | B1 | 6/2003 | Stockdale | 463/29 |
| 6,578,847 | B1 | 6/2003 | Hedrick et al. | 273/138.2 |
| 6,579,180 | B2 | 6/2003 | Soltys et al. | 463/25 |
| 6,579,181 | B2 | 6/2003 | Soltys et al. | 463/25 |
| 6,581,747 | B1 | 6/2003 | Charlier et al. | 194/214 |
| 6,595,857 | B2 | 7/2003 | Soltys et al. | 463/29 |
| 6,607,441 | B1 | 8/2003 | Acres | 463/25 |
| 6,609,978 | B1 | 8/2003 | Paulsen | 463/42 |
| 6,612,928 | B1 | 9/2003 | Bradford et al. | |
| 6,629,184 | B1 | 9/2003 | Berg et al. | 710/306 |
| 6,638,170 | B1 | 10/2003 | Crumby | 463/42 |
| 6,641,484 | B2 | 11/2003 | Oles et al. | 463/47 |
| 6,645,077 | B2 | 11/2003 | Rowe | 463/42 |
| 6,652,378 | B2 | 11/2003 | Cannon et al. | 463/20 |
| 6,656,048 | B2 | 12/2003 | Olsen | |
| 6,663,490 | B2 | 12/2003 | Soltys et al. | 463/25 |
| 6,675,152 | B1 | 1/2004 | Prasad et al. | 705/64 |
| 6,676,522 | B2 | 1/2004 | Rowe et al. | 463/42 |
| 6,682,421 | B1 | 1/2004 | Rowe et al. | 463/25 |
| 6,682,423 | B2 | 1/2004 | Brosnan et al. | 463/29 |
| 6,685,567 | B2 | 2/2004 | Cockerille et al. | 463/43 |
| 6,688,979 | B2 | 2/2004 | Soltys et al. | 463/25 |
| 6,699,128 | B1 | 3/2004 | Beadell et al. | 463/46 |
| 6,702,291 | B2 | 3/2004 | Grebler et al. | |
| 6,712,695 | B2 | 3/2004 | Mothwurf et al. | |
| 6,712,696 | B2 | 3/2004 | Soltys et al. | 463/25 |
| 6,718,361 | B1 | 4/2004 | Basani et al. | |
| 6,722,985 | B2 | 4/2004 | Criss-Puszkiewicz et al. | |
| 6,728,740 | B2 | 4/2004 | Kelly et al. | 708/250 |
| 6,743,102 | B1 | 6/2004 | Fiechter et al. | |
| 6,745,330 | B1 | 6/2004 | Maillot | |
| 6,746,330 | B2 | 6/2004 | Cannon | 463/25 |
| 6,752,312 | B1 | 6/2004 | Chamberlain et al. | 235/375 |
| 6,755,741 | B1 | 6/2004 | Rafaeli | 463/25 |
| 6,758,751 | B2 | 7/2004 | Soltys et al. | 463/29 |
| 6,800,029 | B2 | 10/2004 | Rowe et al. | 463/25 |
| 6,811,488 | B2 | 11/2004 | Paravia et al. | 463/42 |
| 6,817,948 | B2 | 11/2004 | Pascal et al. | 463/42 |
| 6,823,419 | B2 | 11/2004 | Berg et al. | 710/306 |
| 6,837,789 | B2 | 1/2005 | Garahi et al. | 463/29 |
| 6,846,238 | B2 | 1/2005 | Wells | 463/39 |

(56) References Cited

U.S. PATENT DOCUMENTS 6,848,994 B1 2/2005 Knust et al. .................... 463/25
6,854,085 B1 2/2005 Morse
6,866,581 B2 3/2005 Martinek et al. ............... 463/16
6,866,586 B2 3/2005 Oberberger et al. ........... 463/42
6,877,107 B2 4/2005 Giotta et al.
6,884,170 B2 4/2005 Rowe
6,884,173 B2 4/2005 Gauselmann
6,884,174 B2 4/2005 Lundy et al. ................... 463/42
6,896,618 B2 5/2005 Benoy et al. ................... 463/25
6,899,627 B2 5/2005 Lam et al. ...................... 463/40
6,901,440 B1 5/2005 Bimm et al.
6,905,411 B2 6/2005 Nguyen et al. ................. 463/25
6,908,387 B2 6/2005 Hedrick et al.
6,962,530 B2 11/2005 Jackson .......................... 463/29
6,971,956 B2 12/2005 Rowe et al. .................... 463/25
6,993,587 B1 1/2006 Basani et al.
6,997,803 B2 2/2006 LeMay et al. .................. 463/20
7,013,469 B2 3/2006 Smith et al.
7,025,674 B2 4/2006 Adams et al.
7,027,996 B2 4/2006 Levinson
7,035,626 B1 4/2006 Luciano, Jr.
7,050,056 B2 5/2006 Meyringer
7,051,101 B1 5/2006 Dubrovsky et al.
7,062,470 B2 6/2006 Prasad et al. ................... 705/64
7,086,947 B2 8/2006 Walker et al.
7,099,035 B2 8/2006 Brooks et al.
7,100,184 B1 8/2006 Kahn
7,112,138 B2 9/2006 Hedrick et al. ................. 463/29
7,114,718 B2 10/2006 Grauzer et al. ........... 273/149 R
7,116,782 B2 10/2006 Jackson et al. ............... 380/251
7,120,879 B2 10/2006 Gutberlet et al.
7,168,089 B2 1/2007 Nguyen et al. ................... 726/4
7,179,170 B2 2/2007 Martinek et al. ............... 463/29
7,186,181 B2 3/2007 Rowe .............................. 463/42
7,197,765 B2 3/2007 Chan et al.
7,198,571 B2 4/2007 LeMay et al. .................. 463/25
RE39,644 E 5/2007 Alcorn et al.
7,260,834 B1 8/2007 Carlson
7,291,068 B2 11/2007 Bryant et al. ................... 463/25
7,293,282 B2 11/2007 Danforth et al.
7,297,062 B2 11/2007 Gatto et al.
7,300,352 B2 11/2007 Rowe
7,303,475 B2 12/2007 Britt et al.
7,303,745 B2 12/2007 Herz et al.
7,309,065 B2 12/2007 Yoseloff et al. .............. 273/292
7,311,605 B2 12/2007 Moser ............................. 463/25
7,329,185 B2 * 2/2008 Conover et al. ................ 463/25
7,330,822 B1 2/2008 Robson et al.
7,331,520 B2 2/2008 Silva et al.
7,337,330 B2 2/2008 Gatto et al.
7,346,682 B2 3/2008 Basani et al.
7,349,920 B1 3/2008 Feinberg et al.
7,351,147 B2 4/2008 Stockdale et al. .............. 463/29
7,353,183 B1 4/2008 Musso
7,356,770 B1 4/2008 Jackson
7,363,342 B1 4/2008 Wang et al.
7,364,510 B2 4/2008 Walker et al.
7,370,282 B2 5/2008 Cary
7,384,339 B2 6/2008 LeMay et al. .................. 463/30
7,398,327 B2 7/2008 Lee
7,419,428 B2 9/2008 Rowe .............................. 463/25
7,427,236 B2 9/2008 Kaminkow et al.
7,434,805 B2 10/2008 Grauzer et al. ........... 273/149 R
7,435,179 B1 10/2008 Ford
7,438,221 B2 10/2008 Washington et al.
7,438,643 B2 10/2008 Brosnan et al. ................ 463/42
7,455,591 B2 11/2008 Nguyen .......................... 463/42
7,460,863 B2 12/2008 Steelberg et al.
7,465,231 B2 12/2008 Lewin et al.
7,473,178 B2 1/2009 Boyd et al.
7,483,394 B2 1/2009 Chang et al.
7,484,207 B2 1/2009 Sato
7,510,186 B2 3/2009 Fleckenstein ............. 273/149 R
7,510,474 B2 3/2009 Carter, Sr.
7,515,718 B2 4/2009 Nguyen et al.
7,534,169 B2 5/2009 Amaitis et al.
7,549,576 B2 6/2009 Alderucci et al.
7,559,080 B2 7/2009 Bhargavan et al.
7,566,274 B2 7/2009 Johnson et al.
7,575,234 B2 8/2009 Soltys et al.
7,577,847 B2 8/2009 Nguyen et al.
7,585,217 B2 9/2009 Lutnick et al.
7,594,030 B2 9/2009 Teodosiu et al.
7,607,976 B2 10/2009 Baerlocher et al.
7,607,977 B2 10/2009 Baerlocher et al.
7,610,549 B2 10/2009 Vignet
7,611,407 B1 11/2009 Itkis et al.
7,611,409 B2 11/2009 Muir et al.
7,617,151 B2 11/2009 Rowe
7,621,809 B2 11/2009 Baerlocher et al.
7,634,550 B2 12/2009 Wolber et al.
7,637,810 B2 12/2009 Amaitis et al.
7,644,861 B2 1/2010 Alderucci et al.
7,648,414 B2 1/2010 McNutt et al.
7,666,081 B2 2/2010 Baerlocher et al.
7,674,179 B2 3/2010 Baerlocher et al.
7,682,249 B2 3/2010 Winans et al.
7,684,882 B2 3/2010 Baerlocher et al.
7,685,516 B2 3/2010 Fischer
7,688,322 B2 3/2010 Kapler et al.
7,689,302 B2 3/2010 Schlottmann et al.
7,690,995 B2 4/2010 Frankulin et al.
7,699,697 B2 4/2010 Darrah et al.
7,699,703 B2 4/2010 Muir et al.
7,702,719 B1 4/2010 Betz et al.
7,706,895 B2 4/2010 Callaghan
7,712,050 B2 5/2010 Gutberlet et al.
7,722,453 B2 5/2010 Lark et al.
7,730,198 B2 6/2010 Ruppert et al.
7,747,741 B2 6/2010 Basani et al.
7,769,877 B2 8/2010 McBride et al.
7,778,635 B2 8/2010 Crookham et al.
7,780,526 B2 8/2010 Nguyen et al.
7,780,529 B2 8/2010 Rowe et al.
7,785,204 B2 8/2010 Wells et al.
7,787,972 B2 8/2010 Schlottmann et al.
7,788,503 B2 8/2010 Gatto et al.
7,805,719 B2 9/2010 O'Neill
7,828,661 B1 11/2010 Fish et al.
7,841,946 B2 11/2010 Walker et al.
7,844,944 B2 11/2010 Gutberlet et al.
7,846,020 B2 12/2010 Walker et al.
7,850,528 B2 12/2010 Wells
7,857,702 B2 12/2010 Hilbert
7,862,425 B2 1/2011 Cavagna
7,867,081 B2 1/2011 Schneider et al.
7,874,920 B2 1/2011 Hornik et al.
7,874,921 B2 1/2011 Baszucki et al.
7,886,288 B2 2/2011 Breckner et al.
7,892,093 B2 2/2011 Kniesteadt et al.
7,898,679 B2 3/2011 Brack et al.
7,901,294 B2 3/2011 Walker et al.
7,908,486 B2 3/2011 Gatto et al.
7,918,735 B2 4/2011 Inamura
7,921,026 B2 4/2011 O'Cull et al.
7,921,405 B2 4/2011 Gupta et al.
7,937,464 B2 5/2011 Ruppert et al.
7,963,847 B2 6/2011 Baerlocher
7,980,954 B2 7/2011 Gagner et al.
7,993,199 B2 8/2011 Iddings et al.
8,025,574 B2 9/2011 Hilbert
8,028,046 B2 9/2011 Elliott et al.
8,033,913 B2 10/2011 Cockerille et al.
8,037,313 B2 10/2011 Hämäläinen et al.
8,051,180 B2 11/2011 Mazzaferri et al.
8,057,294 B2 11/2011 Pacey et al.
8,057,297 B2 11/2011 Silvestro
8,070,583 B2 12/2011 Baerlocher et al.
8,073,657 B2 12/2011 Moore, III et al.
8,075,403 B2 12/2011 O'Brien et al.
8,117,461 B2 2/2012 Bigelow, Jr. et al.
8,135,793 B2 3/2012 Ruppert et al.
8,147,316 B2 4/2012 Arezina et al.
8,147,334 B2 4/2012 Gatto et al.

(56) References Cited

U.S. PATENT DOCUMENTS 8,171,155 B2 5/2012 Ruppert
8,177,634 B2 * 5/2012 Herrmann et al. ............. 463/25
8,182,346 B2 * 5/2012 Herrmann et al. ............. 463/42
8,185,423 B2 5/2012 Brook et al.
8,187,087 B2 * 5/2012 Herrmann et al. ............. 463/25
8,187,101 B2 * 5/2012 Herrmann et al. ............. 463/42
8,192,289 B2 * 6/2012 Herrmann et al. ............. 463/42
8,195,825 B2 6/2012 Ruppert et al.
8,195,826 B2 6/2012 Ruppert et al.
8,197,340 B2 6/2012 Garvey et al.
8,197,344 B2 6/2012 Rathsack et al.
8,241,111 B2 8/2012 Manfredi et al.
8,246,466 B2 * 8/2012 Herrmann et al. ............. 463/42
8,277,324 B2 * 10/2012 Herrmann et al. ............. 463/43
8,280,777 B2 10/2012 Mengerink et al.
8,285,740 B2 10/2012 Graham et al.
8,308,554 B2 11/2012 Rowe et al.
8,360,870 B2 * 1/2013 Herrmann et al. ............. 463/29
8,366,550 B2 * 2/2013 Herrmann et al. ............. 463/42
8,512,150 B2 * 8/2013 Herrmann et al. ............. 463/43
8,626,878 B2 1/2014 Wolber et al.
2001/0019966 A1 9/2001 Idaka ............................. 463/40
2001/0034237 A1 10/2001 Garahi .......................... 455/456
2002/0004824 A1 1/2002 Cuan et al.
2002/0111213 A1 8/2002 McEntee et al.
2002/0113371 A1 8/2002 Snow
2002/0115487 A1 8/2002 Wells ............................. 463/42
2002/0119824 A1 8/2002 Allen
2002/0142844 A1 10/2002 Kerr ............................... 463/42
2002/0144115 A1 10/2002 Lemay et al.
2002/0147047 A1 10/2002 Letovsky et al.
2002/0151363 A1 10/2002 Letovsky et al.
2002/0152120 A1 10/2002 Howington
2002/0187825 A1 12/2002 Tracy et al. .................... 463/17
2003/0004871 A1 1/2003 Rowe
2003/0022714 A1 1/2003 Oliver ............................ 463/25
2003/0027625 A1 2/2003 Rowe ............................. 463/20
2003/0032474 A1 2/2003 Kaminkow ..................... 463/25
2003/0036425 A1 2/2003 Kaminkow et al. ............ 463/25
2003/0042679 A1 3/2003 Snow
2003/0045354 A1 3/2003 Giobbi ........................... 463/40
2003/0064798 A1 4/2003 Grauzer et al. ................. 463/29
2003/0069074 A1 4/2003 Jackson .......................... 463/43
2003/0075869 A1 4/2003 Breeding et al.
2003/0078103 A1 4/2003 LeMay et al. .................. 463/43
2003/0078789 A1 4/2003 Oren ................................ 705/1
2003/0090064 A1 5/2003 Hoyt et al.
2003/0104865 A1 6/2003 Itkis et al. ...................... 463/39
2003/0130024 A1 7/2003 Darby
2003/0134675 A1 7/2003 Oberberger
2003/0137968 A1 7/2003 Lareau et al. ................ 370/349
2003/0182414 A1 9/2003 O'Neill
2003/0185229 A1 10/2003 Shachar et al.
2003/0186733 A1 10/2003 Wolf et al. ...................... 463/16
2003/0203755 A1 10/2003 Jackson .......................... 463/42
2003/0206548 A1 11/2003 Bannai et al.
2003/0224858 A1 12/2003 Yoseloff et al. ................ 463/43
2003/0228912 A1 12/2003 Wells et al. ..................... 463/43
2003/0232651 A1 12/2003 Huard ............................. 463/42
2004/0002386 A1 1/2004 Wolfe et al.
2004/0002388 A1 * 1/2004 Larsen et al. .................. 463/43
2004/0029635 A1 2/2004 Giobbi ........................... 463/30
2004/0043815 A1 3/2004 Kaminkow ..................... 463/25
2004/0043820 A1 3/2004 Schlottmann ................... 463/43
2004/0048669 A1 3/2004 Rowe
2004/0048671 A1 3/2004 Rowe ............................. 463/42
2004/0064817 A1 4/2004 Shibayama et al.
2004/0068654 A1 4/2004 Cockerille et al. ........... 713/168
2004/0082385 A1 4/2004 Silva et al. ..................... 463/40
2004/0092310 A1 5/2004 Brosnan et al. ................ 463/42
2004/0098579 A1 5/2004 Nakano et al.
2004/0106452 A1 6/2004 Nguyen et al. ................. 463/42
2004/0110119 A1 6/2004 Riconda et al.
2004/0127291 A1 7/2004 George et al.
2004/0133485 A1 7/2004 Schoonmaker et al.
2004/0142744 A1 7/2004 Atkinson et al.
2004/0166918 A1 8/2004 Walker et al. .................. 463/16
2004/0166940 A1 8/2004 Rothschild
2004/0180721 A1 * 9/2004 Rowe .............................. 463/42
2004/0185936 A1 9/2004 Block et al.
2004/0209674 A1 * 10/2004 Conover et al. ................ 463/25
2004/0229684 A1 11/2004 Blackburn et al.
2004/0254010 A1 12/2004 Fine ................................ 463/25
2004/0254993 A1 12/2004 Mamas
2005/0043094 A1 2/2005 Nguyen et al. ................. 463/42
2005/0054438 A1 3/2005 Rothschild et al. ............ 463/29
2005/0055113 A1 3/2005 Gauselmann ................... 700/91
2005/0070358 A1 3/2005 Angell et al. ................... 463/39
2005/0080898 A1 4/2005 Block
2005/0119052 A1 6/2005 Russell et al.
2005/0143166 A1 6/2005 Walker et al. .................. 463/25
2005/0153778 A1 7/2005 Nelson et al.
2005/0171808 A1 8/2005 Saenz et al.
2005/0181856 A1 8/2005 Cannon et al. ................. 463/16
2005/0221882 A1 10/2005 Nguyen et al. ................. 463/16
2005/0222891 A1 10/2005 Chan et al.
2005/0239542 A1 10/2005 Olsen ............................. 463/27
2006/0003828 A1 1/2006 Abecassis
2006/0004618 A1 1/2006 Brixius ............................. 705/8
2006/0009282 A1 1/2006 George et al.
2006/0015716 A1 1/2006 Thornton et al.
2006/0026499 A1 2/2006 Weddle
2006/0031763 A1 2/2006 Yeung
2006/0035707 A1 2/2006 Nguyen et al.
2006/0046849 A1 3/2006 Kovacs ........................... 463/39
2006/0052169 A1 3/2006 Britt et al.
2006/0066444 A1 3/2006 Steeves ........................ 340/10.5
2006/0079310 A1 4/2006 Friedman et al. .............. 463/16
2006/0116208 A1 6/2006 Chen et al. ..................... 463/43
2006/0121970 A1 6/2006 Khal ............................... 463/16
2006/0156020 A1 * 7/2006 Minium .............. G06F 21/6218
713/182
2006/0172804 A1 8/2006 Acres et al.
2006/0183541 A1 8/2006 Okada et al. ................... 463/29
2006/0195847 A1 8/2006 Amano et al.
2006/0205508 A1 9/2006 Green
2006/0217202 A1 9/2006 Burke et al.
2006/0247013 A1 11/2006 Walker et al. .................. 463/20
2006/0247057 A1 11/2006 Green et al.
2006/0252530 A1 11/2006 Oberberger et al.
2006/0253702 A1 11/2006 Lowell et al.
2006/0259604 A1 11/2006 Kotchavi et al.
2006/0277487 A1 12/2006 Poulsen et al. ............... 715/772
2006/0281556 A1 12/2006 Solomon et al. ............... 463/43
2006/0287077 A1 12/2006 Grav et al. ...................... 463/27
2006/0287098 A1 12/2006 Morrow et al.
2007/0004501 A1 1/2007 Brewer et al.
2007/0006329 A1 1/2007 Morrow et al. ................ 726/34
2007/0015583 A1 1/2007 Tran ................................ 463/40
2007/0026935 A1 2/2007 Wolf et al.
2007/0026942 A1 2/2007 Kinsley et al.
2007/0032288 A1 2/2007 Nelson et al.
2007/0033247 A1 2/2007 Martin
2007/0054740 A1 3/2007 Salls et al. ...................... 463/42
2007/0057453 A1 3/2007 Soltys et al. .............. 273/149 P
2007/0057454 A1 3/2007 Fleckenstein ............. 273/149 R
2007/0057469 A1 3/2007 Grauzer et al. ............... 273/309
2007/0060225 A1 3/2007 Hosogai et al.
2007/0060259 A1 3/2007 Pececnik
2007/0060307 A1 3/2007 Mathis et al.
2007/0060320 A1 3/2007 Kelly et al.
2007/0060354 A1 3/2007 Theimer et al.
2007/0060365 A1 3/2007 Tien et al. ...................... 463/42
2007/0077990 A1 4/2007 Cuddy et al. .................. 463/25
2007/0077995 A1 4/2007 Oak et al.
2007/0082737 A1 4/2007 Morrow et al. ................ 463/42
2007/0093298 A1 4/2007 Brunet ........................... 463/42
2007/0105628 A1 5/2007 Arbogast et al.
2007/0111775 A1 5/2007 Yoseloff .......................... 463/16
2007/0111791 A1 5/2007 Arbogast et al. ............... 463/40
2007/0111794 A1 5/2007 Hogan et al.
2007/0117608 A1 5/2007 Roper et al. .................... 463/16
2007/0118844 A1 5/2007 Huang et al.
2007/0123346 A1 5/2007 Perez et al.

(56) References Cited

U.S. PATENT DOCUMENTS

2007/0124483 A1 5/2007 Marples et al.
2007/0129145 A1 6/2007 Blackburn et al.
2007/0139683 A1 6/2007 Wegeng et al.
2007/0155490 A1 7/2007 Phillips et al.
2007/0167235 A1 7/2007 Naicker .......... 463/42
2007/0191102 A1 8/2007 Coliz et al. .......... 463/42
2007/0192748 A1 8/2007 Martin et al. .......... 715/856
2007/0197298 A1* 8/2007 Rowe .......... 463/42
2007/0198418 A1 8/2007 Macdonald et al.
2007/0208816 A1 9/2007 Baldwin et al.
2007/0214030 A1 9/2007 Shear et al.
2007/0218998 A1 9/2007 Arbogast et al.
2007/0235521 A1 10/2007 Mateen et al. .......... 235/379
2007/0238526 A1 10/2007 Chandranmenon et al.
2007/0241497 A1 10/2007 Soltys et al. .......... 273/149 R
2007/0241498 A1 10/2007 Soltys .......... 273/149 R
2007/0243925 A1 10/2007 LeMay et al. .......... 463/20
2007/0243927 A1 10/2007 Soltys .......... 463/25
2007/0243935 A1 10/2007 Huizinga .......... 463/42
2007/0259709 A1 11/2007 Kelly et al.
2007/0259711 A1 11/2007 Thomas .......... 463/22
2007/0265092 A1 11/2007 Betteridge
2007/0287535 A1 12/2007 Soltys .......... 463/29
2007/0298868 A1 12/2007 Soltys .......... 463/25
2008/0004108 A1 1/2008 Klinkhammer
2008/0009344 A1 1/2008 Graham et al.
2008/0026832 A1 1/2008 Stevens et al.
2008/0026848 A1 1/2008 Byng
2008/0038035 A1 2/2008 Shuldman et al.
2008/0045341 A1 2/2008 Engleman
2008/0045342 A1 2/2008 Crowder, Jr. et al.
2008/0045344 A1 2/2008 Schlottmann et al. .......... 463/25
2008/0058105 A1 3/2008 Combs et al.
2008/0064501 A1 3/2008 Patel
2008/0065590 A1 3/2008 Castro et al.
2008/0076572 A1 3/2008 Nguyen et al.
2008/0090651 A1 4/2008 Baerlocher .......... 463/27
2008/0091490 A1 4/2008 Abrahams et al.
2008/0096659 A1 4/2008 Kreloff et al.
2008/0102919 A1 5/2008 Rowe et al.
2008/0102932 A1 5/2008 Anderson et al.
2008/0108405 A1 5/2008 Brosnan et al.
2008/0108433 A1 5/2008 DiMichele et al.
2008/0113764 A1 5/2008 Soltys .......... 463/22
2008/0113771 A1 5/2008 Baerlocher et al.
2008/0113772 A1 5/2008 Burrill et al.
2008/0113773 A1 5/2008 Johnson et al.
2008/0119284 A1 5/2008 Luciano, Jr. et al.
2008/0126803 A1 5/2008 Ginter et al.
2008/0127174 A1 5/2008 Johnson
2008/0138773 A1 6/2008 Lathrop
2008/0146337 A1 6/2008 Halonen et al. .......... 463/42
2008/0153599 A1 6/2008 Atashband et al. .......... 463/42
2008/0153600 A1 6/2008 Swarna .......... 463/43
2008/0154916 A1 6/2008 Atashband .......... 707/10
2008/0155665 A1 6/2008 Ruppert et al. .......... 726/5
2008/0162729 A1 7/2008 Ruppert .......... 709/249
2008/0165771 A1 7/2008 Gainey et al.
2008/0171588 A1 7/2008 Atashband .......... 463/20
2008/0171598 A1 7/2008 Deng .......... 463/40
2008/0171602 A1 7/2008 Patel et al.
2008/0200255 A1 8/2008 Eisele .......... 463/42
2008/0243697 A1 10/2008 Irving et al.
2008/0244565 A1 10/2008 Levidow et al.
2008/0261699 A1 10/2008 Topham et al.
2008/0261701 A1 10/2008 Lewin et al.
2008/0268934 A1 10/2008 Mattice et al.
2008/0287197 A1 11/2008 Ruppert et al.
2008/0293494 A1 11/2008 Adiraju et al.
2008/0300046 A1 12/2008 Gagner et al.
2008/0311971 A1 12/2008 Dean
2008/0313282 A1 12/2008 Warila et al.
2008/0318655 A1 12/2008 Davies
2008/0318685 A9 12/2008 Oak et al.
2008/0318686 A1 12/2008 Crowder, Jr. et al.
2009/0005176 A1 1/2009 Morrow et al.
2009/0005177 A1 1/2009 Kish et al.
2009/0011833 A1 1/2009 Seelig et al.
2009/0054139 A1 2/2009 Anderson
2009/0063309 A1 3/2009 Stephens
2009/0069090 A1 3/2009 Moser et al.
2009/0115133 A1 5/2009 Kelly et al. .......... 273/274
2009/0117994 A1 5/2009 Kelly et al. .......... 463/25
2009/0118001 A1 5/2009 Kelly et al. .......... 463/29
2009/0118005 A1 5/2009 Kelly et al. .......... 463/31
2009/0118006 A1 5/2009 Kelly et al. .......... 463/31
2009/0124329 A1 5/2009 Palmisano
2009/0124350 A1 5/2009 Iddings et al.
2009/0124392 A1 5/2009 Ruppert et al. .......... 463/42
2009/0124394 A1 5/2009 Swarna .......... 463/43
2009/0125603 A1 5/2009 Atashband et al. .......... 709/207
2009/0131134 A1 5/2009 Baerlocher et al.
2009/0131144 A1 5/2009 Allen .......... 463/20
2009/0131163 A1 5/2009 Arbogast et al. .......... 463/29
2009/0132720 A1 5/2009 Ruppert et al. .......... 709/231
2009/0156313 A1 6/2009 Blackburn et al.
2009/0163279 A1 6/2009 Hermansen .......... 463/42
2009/0170594 A1 7/2009 Delaney et al.
2009/0176568 A1 7/2009 Reddy et al.
2009/0176578 A1* 7/2009 Herrmann et al. .......... 463/43
2009/0176580 A1* 7/2009 Herrmann et al. .......... 463/43
2009/0181776 A1 7/2009 Deng .......... 463/42
2009/0183243 A1 7/2009 Ruppert et al. .......... 726/5
2009/0189351 A1 7/2009 Baerlocher et al.
2009/0197676 A1 8/2009 Baerlocher et al.
2009/0239667 A1 9/2009 Rowe et al.
2009/0270170 A1 10/2009 Patton
2009/0275374 A1 11/2009 Nelson et al. .......... 463/16
2009/0275394 A1 11/2009 Young et al.
2009/0275395 A1 11/2009 McAllister et al. .......... 463/25
2009/0275400 A1 11/2009 Rehm et al.
2009/0275401 A1 11/2009 Allen et al. .......... 463/29
2009/0275402 A1 11/2009 Backover et al. .......... 463/29
2009/0275407 A1 11/2009 Singh et al. .......... 463/31
2009/0276341 A1 11/2009 McMahan et al.
2009/0276715 A1 11/2009 Arbogast et al. .......... 715/736
2009/0298575 A1 12/2009 Hopkins et al.
2009/0307069 A1 12/2009 Meyerhofer
2009/0325708 A9 12/2009 Kerr
2009/0325716 A1 12/2009 Harari
2010/0022299 A1 1/2010 Ryan
2010/0048291 A1* 2/2010 Warkentin .......... 463/25
2010/0058320 A1 3/2010 Milligan et al.
2010/0062835 A1 3/2010 Hopkins
2010/0062838 A1 3/2010 Nguyen et al.
2010/0093440 A1 4/2010 Burke
2010/0210353 A1 8/2010 Gagner et al.
2011/0009184 A1 1/2011 Byng
2011/0059800 A1 3/2011 Anderson et al.
2011/0111826 A1 5/2011 Baerlocher et al.
2011/0124417 A1 5/2011 Baynes et al.
2011/0179409 A1 7/2011 Yoseloff et al.
2011/0269534 A1 11/2011 Kelly et al.
2012/0110649 A1 5/2012 Murphy
2012/0115616 A1 5/2012 Phillips et al.
2012/0203692 A1 8/2012 Olliphant et al.

FOREIGN PATENT DOCUMENTS

EP 1 463 008 A2 9/2004
GB 2 380 143 A 4/2003
JP 7-88253 A 4/1995
JP 8255059 10/1996
KR 2001-0084838 9/2001
KR 2002-0061793 7/2002
KR 2003-0091635 12/2003
WO 02/05914 A1 1/2002
WO 03/060846 A2 7/2003

(56) References Cited

FOREIGN PATENT DOCUMENTS

| | | | |
|---|---|---|---|
| WO | 2005-035084 | A1 | 4/2005 |
| WO | 2007/033207 | A2 | 3/2007 |

OTHER PUBLICATIONS

Atashband et al., U.S. Appl. No. 12/620,402, filed Nov. 16, 2009, 46 pages.
Bally Technologies, Inc., iVIEW, http://ballytech.com/systems/product.cfm?id=9, download date Nov. 6, 2007, 2 pages.
Bally TMS, "MP21—Automated Table Tracking/Features," 2 pages, Nov. 2005.
Bally TMS, "MPBacc—Specifications/Specifications," 2 pages, Nov. 2005.
Bally TMS, "MPLite—Table Management System/Features," 2 pages, Nov. 2005.
Bulavsky, J., "Tracking the Tables," *Casino Journal,* May 2004, pp. 44-47, accessed Dec. 21, 2005, URL = http://www.ascendgaming.com/cj/vendors_manufacturers_table/Trackin916200411141AM.htm, 5 pages.
Burke, A., "Tracking the Tables," reprinted from *International Gaming & Wagering Business,* Aug. 2003, 4 pages.
Crowder, U.S. Appl. No. 12/271,736, filed Nov. 14, 2008.
Gros, R., "All You Ever Wanted to Know About Table Games," reprinted from *Global Gaming Business,* Aug. 1, 2003, 2 pages.
International Search Report received in U.S. Appl. No. 12/112,691, dated Dec. 14, 2009, 2 pages.
Jones, U.S. Appl. No. 12/473,617, filed May 28, 2009, 70 pages.
Mikohn, "Mikohn Tablelink—The Industry's Premier Table Tracking Solution Delivers Improvements Straight to the Bottom Line," 2 pages, before Jan. 1, 2004.
Mikohn, "Tablelink™, The New Standard in Table Games," before Jan. 1, 2004, 14 pages.
Rajaraman et al., U.S. Appl. No. 12/500,298, filed Jul. 9, 2009, 50 pages.
Ruppert et al., U.S. Appl. No. 12/620,404, filed Nov. 16, 2009, 70 pages.
Singh et al., U.S. Appl. No. 12/271,337, filed Nov. 14, 2008, 35 pages.
Terdiman, D., "Who's Holding the Aces Now?", reprinted from *Wired News,* Aug. 18, 2003, 2 pages.
White et al., U.S. Appl. No. 12/470,353, filed May 21, 2009, 410 pages.
White et al., U.S. Appl. No. 12/470,349, filed May 21, 2009, 411 pages.
Winkler, C., "Product Spotlight: MindPlay," reprinted from *Gaming and Leisure Technology,* Fall 2003, 2 pages.
Written Opinion received in U.S. Appl. No. 12/112,691, dated Dec. 14, 2009, 3 pages.
"BOB and LDAP," Gaming Standards Association, Fremont, California, 7 pages, Oct. 26, 2003.
"GSA Point-to-Point SOAP/HTTPS Transport and Security Specification v1.0.3," Gaming Standards Association TRANSPORT Technical Committee, 16 pages, Jun. 5, 2007.
Gwyddion User Guide, "False Color Mapping: Chapter 3. Getting Started," retrieved from URL=http://sourceforge.net/projects/gwyddion/files/user-guide/2007-06-28/gwyddion-user-guide-xhtml-2007-06-28.tar.gz/download, retrieved on Nov. 21, 2012, 2 pages.
Hung et al., "Performance Evaluation of the Least Conflict Sharable Spreading Code Assignment Algorithm," IEEE, 1996, 5 pages.
MagTek, "Port Powered Swipe Reader," Technical Reference Manual, Manual Part No. 99875094 Rev 12, Jun. 2003, 20 pages.
Olesiejuk, "Discovery Services for Gaming Devices on a Casino Floor," Gaming Standards Association, 3 pages, Mar. 12, 2007.
Requirements document, "Game Authentication Terminal Program (GAT3)," to Gaming Standards Association, Aug. 2005, 27 pages.
Standards document, "Technical Standards for Gaming Devices and On-Line Slot Systems," to Nevada Gaming Commission and State Gaming Control Board, Aug. 17, 2005, 15 pages.

* cited by examiner

INFORMATION DISTRIBUTION IN GAMING NETWORKS

BACKGROUND

1. Technical Field

This description generally relates to the field of gaming networks and gaming properties, and more particularly to managing and distributing information among gaming properties.

2. Description of the Related Art

With the growth in the gaming industry, many gaming properties (such as casinos, casino hotels, sports books, etc.) must now keep track of hundreds of thousands of transactions each day. To facilitate wagering, gaming properties have also begun to provide credit and banking services typically associated with banks and other traditional financial institutions. For example, many gaming properties now accept deposits from patrons (as "front money"), extend short-term loans to patrons ("marker payments"), and maintain patron cash accounts. As a result, gaming properties have come to rely upon large and complex accounting databases for managing the constant inflow and outflow of cash and credit.

Many gaming properties have also developed systems (which may or may not be independent from the above-described accounting databases) for recognizing and rewarding their patrons. For example, gaming properties frequently issue patron club cards (e.g., patron promotional cards, patron tracking cards, loyalty program cards). These patron club cards are unique to each patron and may be used by the gaming properties to monitor gambling, lodging, dining and other activities of their patrons. The patron club cards may also be associated with patrons' cash accounts and other financial services that patrons may access at the gaming property. All of this information may then be tracked on patron databases.

Despite this increasing accounting complexity within each gaming property, gaming properties are often independently operated, and very little information is shared between them. Indeed, although many gaming properties are commonly owned by large corporations, the gaming properties are often run as separate entities with their own accounting and patron databases. As a result, cash vouchers, coupons and promotional deals originating at one gaming property are often not accepted at other gaming properties. Moreover, commonly owned gaming properties are typically unable to provide their patrons with access to all of the same financial resources.

It would therefore be desirable to provide a method for securely and efficiently sharing information among gaming properties.

BRIEF SUMMARY

In one embodiment, a computer-implemented method for distributing patron information in a gaming network is described, the method comprising: logically associating a first plurality of gaming properties to create a first property group, the first plurality of gaming properties including an originating gaming property and a requesting gaming property; generating a set of permissions for the first property group; receiving patron information associated with at least one patron from the originating gaming property; receiving a request for the patron information from the requesting gaming property; verifying the request based at least in part on the set of permissions; and if the request is verified, transmitting the patron information to the requesting gaming property.

In another embodiment, a computer-implemented method for redeeming vouchers in a gaming network is described, the method comprising: generating a voucher having a value at a first gaming property; storing information indicative of the voucher; receiving the voucher at a second gaming property; verifying the voucher based at least in part on the stored information; if the voucher is verified, redeeming at least a portion of the value of the voucher at the second gaming property; and updating the stored information based at least in part on the portion of the value redeemed at the second gaming property.

In yet another embodiment, a database server for distributing patron information in a gaming network comprises: a processor that executes instructions; and a computer-readable memory that stores instructions that cause the processor to distribute patron information by: logically associating a first plurality of gaming properties to create a first property group, the first plurality of gaming properties including an originating gaming property and a requesting gaming property; generating a set of permissions for the first property group; receiving patron information associated with at least one patron from the originating gaming property; receiving a request for the patron information from the requesting gaming property; verifying the request based at least in part on the set of permissions; and if the request is verified, transmitting the patron information to the requesting gaming property.

In still another embodiment, a database server for redeeming vouchers in a gaming network comprises: a processor that executes instructions; and a computer-readable memory that stores instructions that cause the processor to enable voucher redemption by: receiving information indicative of a voucher generated at a first gaming property, the voucher having a value; storing the information indicative of the voucher; receiving a request to verify the voucher from a second gaming property; verifying the voucher based at least in part on the stored information; and updating the stored information based at least in part on at least a portion of the value redeemed at the second gaming property.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF EMBODIMENTS OF THE INVENTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures and methods associated with gaming properties, networks, computing devices, game devices, and accounting processes have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the embodiments.

Description of a Gaming Network Including a Universal Patron Server

Figure 1:
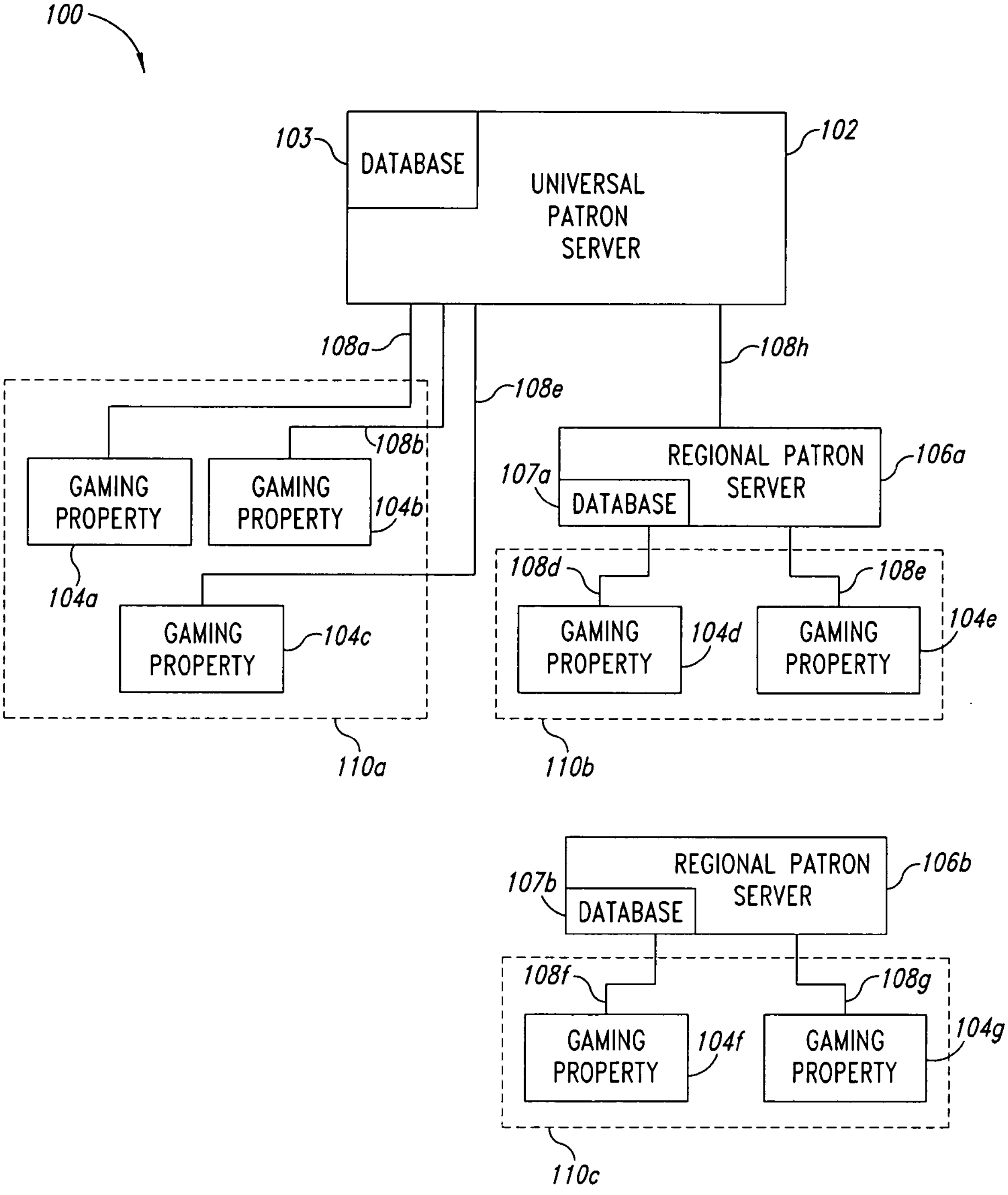
FIG. 1 is a high-level block diagram of a gaming network including a universal patron server coupled to a plurality of gaming properties, according to one illustrated embodiment.

FIG. 1 illustrates a gaming network 100 including a universal patron server 102 communicatively coupled to a plurality of gaming properties 104*a-e* (collectively 104). In addition, two regional patron servers 106*a, b* (collectively 106) are also communicatively coupled to respective groups of gaming properties 104*d, e* and 104*f, g*. As illustrated, the gaming network 100 may facilitate the distribution of information among a plurality of gaming properties 104, as described in greater detail with respect to FIG. 3.

The gaming properties 104 may comprise any of a variety of establishments for hosting at least some form of gaming/gambling. The gaming properties 104 may include, for example, casinos, casino hotels, poker rooms, racetracks, off-track betting rooms, sports books, etc. Even convenience stores or gas stations having one or more game devices (e.g., slot machines) may comprise at least one of the gaming properties 104. In one embodiment, each gaming property 104 may comprise a single building including at least one room for gaming/gambling.

In one embodiment, the gaming properties 104 making up the gaming network 100 may be commonly owned by a corporation. In another embodiment, the gaming properties 104 may be governed or controlled by a common governing body, which may mandate that certain information be shared among the gaming properties 104. In yet another embodiment, other relationships may exist among the gaming properties 104.

The gaming properties 104 may also be located in any of a variety of geographical locations. For example, the gaming properties 104 may be located in Nevada, in Atlantic City, on Native American reservation land, on riverboats, in a number of countries outside the United States, etc. These different geographical locations may define different jurisdictions that are governed by different laws, rules and/or regulations. The laws may prohibit particular types of gambling, may prohibit particular types of wagers, may dictate particular payout structures, or may otherwise affect the operation of a corresponding gaming property 104.

In one embodiment, each gaming property 104 may comprise at least one local computer server (not shown) coupled to the gaming network 100. Each local server may be configured to receive, process and at least temporarily store information associated with at least one patron of a respective gaming property 104. This patron information may comprise any type of information associated with the gaming property's patrons, including financial information, promotional information, personal information, historical preferences, marketing information, etc. In different embodiments, more or fewer local servers may be deployed at each gaming property 104. Indeed, in certain embodiments, different local servers may be configured to store particular types of patron information.

In one embodiment, the gaming properties 104 may provide certain financial services to their patrons, and the local servers may process and at least temporarily store such financial information. For example, the gaming properties 104 may accept deposits from patrons against which wagers may be made, and information regarding each patron's "front money" balance may be maintained on the local server. As another example, the gaming properties 104 may extend short-term loans to patrons, and information regarding these "marker" payments may also be maintained on the local server. As yet another example, a simple patron cash account may be maintained at a gaming property 104, and information indicative of the patron cash account may be stored on the local server.

In another embodiment, the local servers may process and at least temporarily store promotional information associated with at least one patron. For example, a gaming property 104 may award bonuses to patrons based on an amount or frequency of wagering, and information regarding each patron's bonuses may be maintained on the local server. These bonuses may be redeemable for cash, credits, non-cash awards, etc. As another example, a gaming property 104 may give incentive cash to its patrons, which may be spent or wagered at the gaming property 104, and information regarding each patron's incentive cash balance may be maintained on the local server. As yet another example, coupons, such as chip purchase vouchers, may be awarded to patrons, and information regarding such coupons may be maintained on the local server.

In yet another embodiment, the gaming properties 104 may compile and at least temporarily store personal information (including historical preferences) on the local servers. This personal information may include a patron identifier for uniquely identifying a patron. The patron identifier may comprise an identifier associated with a patron club card issued by the gaming property 104, and, in one embodiment, the patron identifier may include a patron account number as well as an identifier associated with the issuing gaming property 104. As another example, the personal information maintained on the local server may include contact information, a credit history, patron gaming statistics, a patron's reaction to a marketing campaign, etc.

Each gaming property 104 may further include a plurality of networked computing devices (not shown) communicatively coupled to the local server. These networked computing devices may include game devices, public terminals, employee terminals, handheld devices, etc. that may collect/generate the above-described patron information and then forward it on to the local server. For example, in one embodiment, a gaming property 104 may include a plurality of game devices communicatively coupled to the local server. These game devices may each receive and process patron club cards issued to patrons of the gaming property 104. Patron information, including money won or lost at the game devices as well as gaming habits of the patrons using the game devices, may then be forwarded to the local server.

As illustrated, the gaming properties 104 may also be networked together such that patron information may be shared among them. In one embodiment, logical connections 108*a-h* (collectively 108) may be formed between the various gaming properties 104, the regional patron servers 106, and the universal patron server 102. This gaming network 100 of gaming properties and servers and associated logical connections 108 may comprise any of a variety of networks and related hardware and/or software. The gaming network 100 may comprise a wired or wireless enterprise-wide computer network, intranet, extranet or the Internet. Other embodiments may be implemented in other types of communication networks, including telecommunications networks, cellular networks, and other mobile networks. The illustrated logical connections 108 may be wired or wireless and may employ any of a variety of network protocols.

In one embodiment, the gaming properties 104 may be coupled to the gaming network 100 via the local servers. In other embodiments, other computing devices associated with the gaming properties 104 may comprise nodes in the gaming network 100.

As illustrated, in one embodiment, the gaming properties 104 may be communicatively coupled directly or indirectly to one or more patron databases hosted on one or more remote computer servers. For example, the gaming properties 104*a-c* may be communicatively coupled to the universal patron server 102, which hosts a corresponding universal patron database 103, and the gaming properties 104*d, e* may be communicatively coupled to the universal patron server 102 as well as the regional patron server 106*a*, which hosts a corresponding regional patron database 107*a*. As another example, the gaming properties 104*f, g* may be communicatively coupled to the regional patron server 106*b*, which hosts a regional patron database 107*b*. In another embodiment, the patron servers may not be provided in the gaming network 100, and the gaming properties 104 may be communicatively coupled to each other in a peer-to-peer networking architecture.

In one embodiment, the patron servers may receive patron information from one or more of the gaming properties 104 coupled (directly or indirectly) thereto. For example, the universal patron server 102 may receive patron information from any of the gaming properties 104*a-e*, and the regional patron server 106*a* may receive patron information from any of the gaming properties 104*a-e*. In another embodiment, a hierarchical arrangement may be implemented, whereby the patron servers may receive patron information associated with gaming properties 104 within their respective domain. In such an embodiment, the universal patron server 102 may receive patron information from any of the gaming properties 104*a-e*, but the regional patron server 106*a* may be configured to receive patron information only from gaming properties 104*d-e*. In such an embodiment, the regional patron server 106*a* may receive some subset of the patron information received by the universal patron server 102. It may be understood that, although there are no logical connections illustrated between the gaming properties 104*f, g* and the universal patron server 102, these nodes may, in fact, be communicatively coupled. Instead, the absence of a logical connection between the gaming properties 104*f, g* and the universal patron server 102 merely reflects an embodiment in which patron information is not sent from the gaming properties 104*f, g* to the universal patron server 102 (or vice versa).

In one embodiment, the patron databases may also store the patron information received from the gaming properties 104 coupled (directly or indirectly) thereto. For example, the universal patron database 103 may store patron information from the gaming properties 104*a-e*, and the regional patron database 107*a* may store patron information from any of the gaming properties 104*d-e*. The patron databases may comprise the sole relatively permanent storage for the patron information. However, in other embodiments, redundant storage may be implemented. For example, the patron information may be stored at local servers in the gaming properties 104 themselves as well as in the patron databases.

The patron servers may be further configured to send the patron information to one or more gaming properties 104 coupled (directly or indirectly) thereto. Thus, patron information from one gaming property 104 may be distributed to other gaming properties 104 logically connected thereto. Different permissions may enable different types of patron information to be shared among the gaming properties 104, as described in greater detail with respect to FIG. 3.

More complicated gaming networks may be implemented in other embodiments. For example, greater numbers of regional patron servers may be positioned hierarchically between the gaming properties and the universal patron server. In addition, more regional patron servers may be implemented, like regional patron server 106*b*, that do not share patron information with the universal patron server.

In one embodiment, the patron servers may be located remotely from the gaming properties 104 communicatively coupled thereto. In another embodiment, the patron servers may be located at any one of the gaming properties 104 (e.g., implemented in a local computer associated with a gaming property), and the other gaming properties 104 may be communicatively coupled directly to that particular gaming property.

The patron databases may also be hosted on any of a variety of types of hardware. Indeed, in one embodiment, the regional and universal patron databases may be hosted on the same patron server. As will be described in greater detail with reference to FIG. 2, any of a number of database servers may provide the functionality of the universal patron server 102, and the regional patron servers 106*a, b.*

As shown in FIG. 1, the gaming properties 104 may also be logically associated in a variety of ways to create a plurality of property groups 110*a-c*. As discussed in greater detail with respect to FIG. 3, these property groups 110 may define the manner in which information is shared among the gaming properties 104. A first property group 110*a* may comprise gaming properties 104*a-c*; a second property group 110*b* may comprise gaming properties 104*d, e*; and a third property group 110*c* may comprise gaming properties 104*f, g*. In one embodiment, these logical associations may be created and maintained within the patron databases. For example, the composition of the property groups 110*a-c* may be stored on the universal patron database 103 or on a respective regional patron database 107*a, b*. In other embodiments, these logical associations may be created and maintained in a local server of at least one of the gaming properties 104.

The logical associations between the gaming properties 104 may be generated based on any of a variety of gaming property characteristics. In one embodiment, the gaming properties 104 may be logically associated with one another based at least in part on their geographical locations. For example, gaming properties 104*a-c* may be located in Las Vegas; gaming properties 104*d, e* may be located in Atlantic City; and gaming properties 104*f, g* may be located on Native American reservation land within California. In another embodiment, the gaming properties 104 may be logically associated with one another based at least in part on laws associated with jurisdictions of the gaming properties 104. For example, jurisdictional laws associated with Native American reservation lands may be common across geographical boundaries. In other embodiments, the gaming properties 104 may be logically associated based on size, revenues, surrounding area demographics, target patrons, or according to any other gaming property characteristics.

In one embodiment, a single gaming property 104 may also be logically associated with more than one property group, such that the property groups are nested or at least overlapping. For example, a larger property group (not shown) may include all of the gaming properties 104*a-e*, while the first property group 110*a* may comprise a subset of the larger property group, namely the gaming properties 104*a-c*.

Description of a Suitable Server

Figure 2:
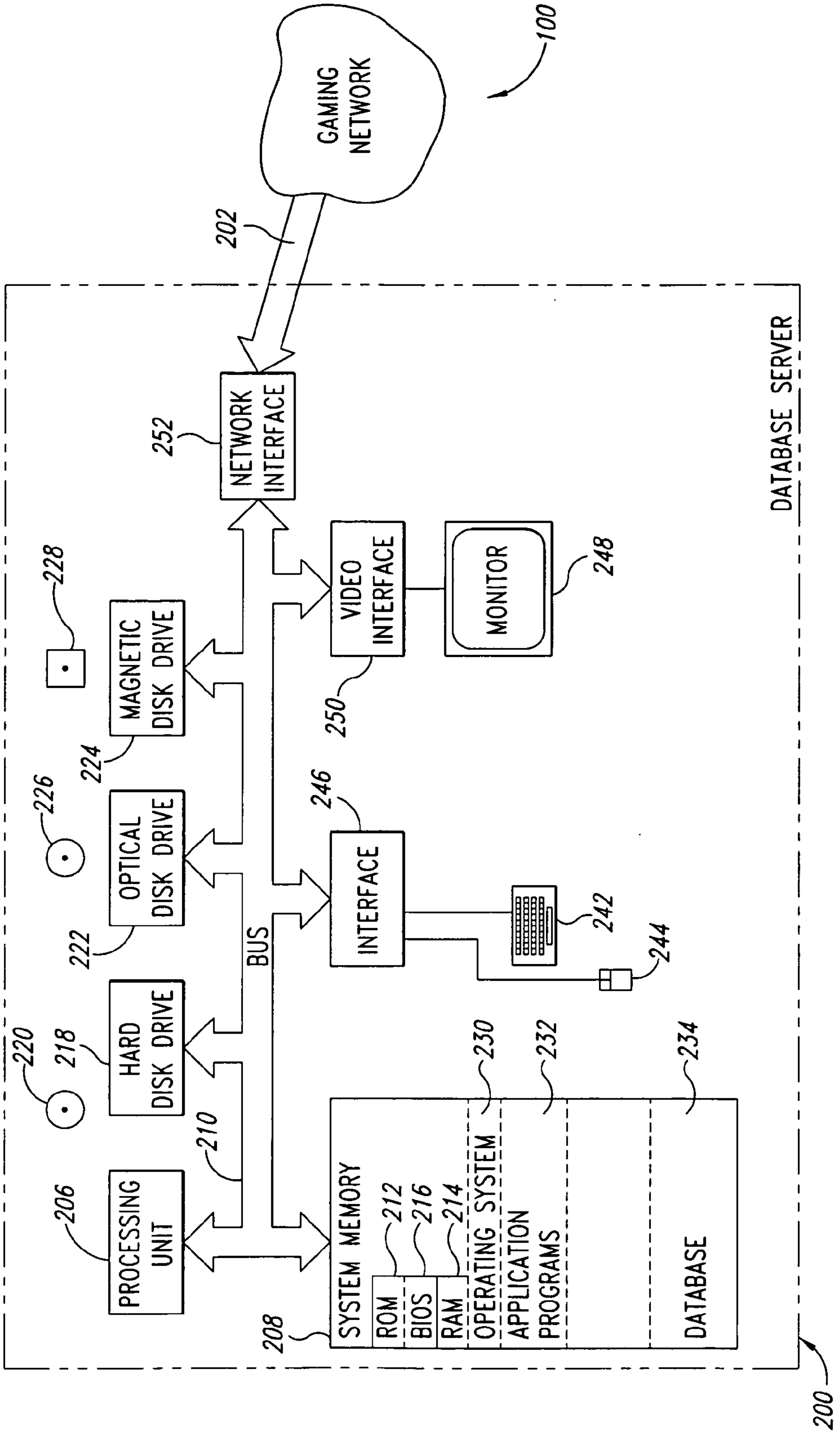
FIG. 2 is a schematic view of a database server for implementing the universal patron server of FIG. 1, according to one illustrated embodiment.

FIG. 2 and the following discussion provide a brief, general description of a suitable database server 200 for use as the universal patron server 102 or the regional patron servers 106*a, b*. Such a database server 200 may host the universal patron database 103 or the regional patron databases 107*a, b*. In addition, a similar computing environment may also be used as a local server within any one of the gaming properties 104. Although not required, the embodiments will be described in the general context of computer-executable instructions, such as program application modules, objects, or macros being executed by a computer. Those skilled in the relevant art will appreciate that the illustrated embodiments as well as other embodiments can be practiced with other computer system configurations, including handheld devices, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

FIG. 2 shows a database server 200. The database server 200 is coupled by at least one communication channel/logical connection 202 to the gaming network 100. This logical connection 202 may serve as any one of the logical connections 108 illustrated in FIG. 1 communicatively coupling the patron servers and the gaming properties 104.

The database server 200 may take the form of a conventional PC, which includes a processing unit 206, a system memory 208 and a system bus 210 that couples various system components including the system memory 208 to the processing unit 206. The database server 200 will at times be referred to in the singular herein, but this is not intended to limit the embodiments to a single computing device, since in certain embodiments, there will be more than one networked computing device involved. Non-limiting examples of commercially available systems include, but are not limited to, an 80x86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processing unit 206 may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks shown in FIG. 2 are of conventional design. As a result, such blocks need not be described in further detail herein, as they will be understood by those skilled in the relevant art.

The system bus 210 can employ any known bus structures or architectures, including a memory bus with memory controller, a peripheral bus, and a local bus. The system memory 208 includes read-only memory ("ROM") 212 and random access memory ("RAM") 214. A basic input/output system ("BIOS") 216, which can form part of the ROM 212, contains basic routines that help transfer information between elements within the database server 200, such as during start-up.

The database server 200 also includes a hard disk drive 218 for reading from and writing to a hard disk 220, and an optical disk drive 222 and a magnetic disk drive 224 for reading from and writing to removable optical disks 226 and magnetic disks 228, respectively. The optical disk 226 can be a CD or a DVD, while the magnetic disk 228 can be a magnetic floppy disk or diskette. The hard disk drive 218, optical disk drive 222 and magnetic disk drive 224 communicate with the processing unit 206 via the system bus 210. The hard disk drive 218, optical disk drive 222 and magnetic disk drive 224 may include interfaces or controllers (not shown) coupled between such drives and the system bus 210, as is known by those skilled in the relevant art. The drives 218, 222, 224, and their associated computer-readable media 220, 226, 228, provide nonvolatile storage of computer-readable instructions, data structures, program modules and other data for the database server 200. Although the depicted database server 200 employs hard disk 220, optical disk 226 and magnetic disk 228, those skilled in the relevant art will appreciate that other types of computer-readable media that can store data accessible by a computer may be employed, such as magnetic cassettes, flash memory cards, Bernoulli cartridges, RAMs, ROMs, etc.

Program modules can be stored in the system memory 208, such as an operating system 230, one or more application programs 232, and a database 234. The system memory 208 may also include communications programs for permitting communications over the gaming network 100.

While shown in FIG. 2 as being stored in the system memory 208, the operating system 230, application programs 232, and database 234 can be stored on the hard disk 220 of the hard disk drive 218, the optical disk 226 of the optical disk drive 222 and/or the magnetic disk 228 of the magnetic disk drive 224. The database 234 may store a variety of information associated with patrons of the gaming properties 104, and it may be understood to comprise a universal or regional patron database, as appropriate.

A user can enter commands and information into the database server 200 through input devices such as a touch screen or keyboard 242 and/or a pointing device such as a mouse 244. Other input devices can include a microphone, joystick, game pad, tablet, scanner, etc. These and other input devices are connected to the processing unit 206 through an interface 246 such as a universal serial bus ("USB") interface that couples to the system bus 210, although other interfaces such as a parallel port, a game port or a wireless interface or a serial port may be used. A monitor 248 or other display device is coupled to the system bus 210 via a video interface 250, such as a video adapter. Although not shown, the database server 200 can include other output devices, such as speakers, printers, etc.

The database server 200 operates in a networked environment using one or more logical connections 202 to communicate with one or more remote computers, database servers and/or other computing devices through the gaming network 100. These logical connections 202 may facilitate any known method of permitting computers to communicate, such as through one or more LANs and/or WANs, such as the Internet. Such networking environments are well known in wired and wireless enterprise-wide computer networks, intranets, extranets, and the Internet. Other embodiments include other types of communication networks including telecommunications networks, cellular networks, and other mobile networks.

In one embodiment, a network interface 252 (communicatively linked to the system bus 210), may be used for establishing communications over the logical connection 202. In a networked environment, program modules, application programs, or databases, or portions thereof, can be stored outside of the database server 200 (not shown). Those skilled in the relevant art will recognize that the network connections shown in FIG. 2 are only some examples of ways of establishing communications between computers, and other connections may be used.

Figure 3:
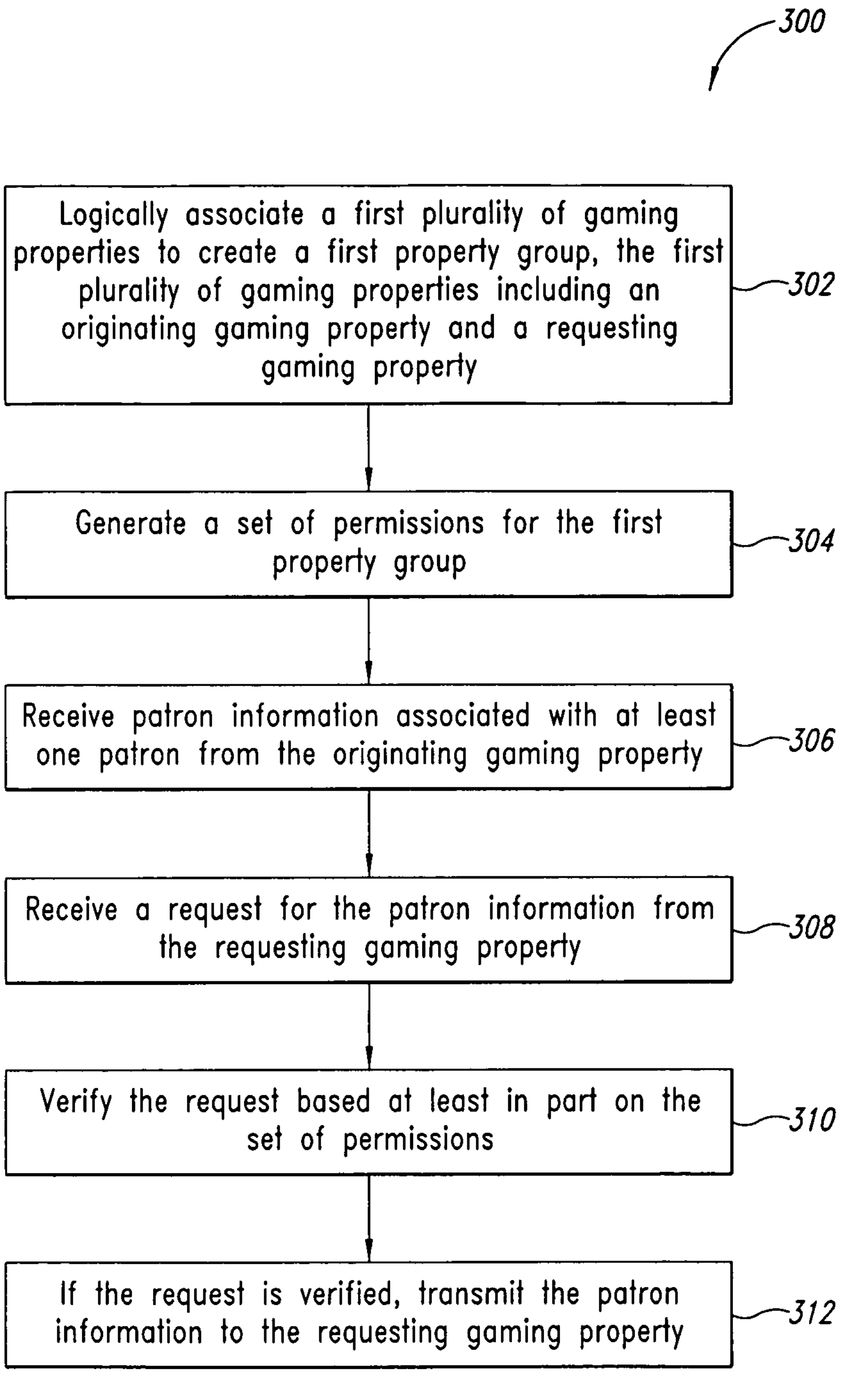
FIG. 3 is a flow diagram illustrating a method for distributing patron information in a gaming network, according to one illustrated embodiment.

Discussion of a Method for Distributing Patron Information According to One Embodiment FIG. 3 illustrates a flow diagram for a method 300 of distributing patron information in a gaming network, according to one embodiment. This method 300 will be discussed in the context of the gaming network 100 illustrated in FIG. 1. However, it may be understood that the acts disclosed herein may also be executed in different gaming networks in accordance with the described method.

The method begins at act 302, when a plurality of gaming properties 104*a-c* are logically associated to create a first property group 110*a*, the plurality of gaming properties 104*a-c* including an originating gaming property 104*a* and a requesting gaming property 104*b*. In one embodiment, the universal patron server 102 may logically associate the plurality of gaming properties 104*a-c* in an internal data structure of the universal patron database 103 in order to create the first property group 110*a*. In another embodiment, the respective gaming properties 104 may be logically associated within the regional patron database 107*a*, or, in still another embodiment, the gaming properties 104 themselves may logically associate with one another in a peer-to-peer networking architecture.

The logical associations reflected by this first property group 110*a* may indicate that at least some patron information may be shared among the gaming properties 104*a-c*. Of course, as described below with respect to act 304, not all of the patron information associated with each gaming property 104 need be shared within a property group. In other embodiments, the first property group 110*a* may also be used for other purposes. For example, the logical associations reflected by the first property group 110*a* may be used by a corporation owning the gaming properties 104*a-c* to consolidate financial information from these gaming properties 104*a-c*, and to perform accounting for the plurality of gaming properties 104*a-c*.

The gaming properties 104*a-c* may be logically associated based on any of a number of gaming property characteristics, as discussed above. In other embodiments, the gaming properties 104*a-c* may be logically associated based not on particular characteristics of the gaming properties 104*a-c* themselves, but rather upon a user's choice for categorizing and managing the gaming properties 104*a-c*. For example, the gaming properties 104*a-c* may be logically associated based on a management structure of a corporation owning the gaming properties 104*a-c*.

The gaming properties 104*a-c* may be logically associated in a variety of ways. In one embodiment, the gaming properties 104*a-c* may be logically associated automatically according to preset parameters. For example, the universal patron server 102 may logically associate gaming properties 104 located within a common geographical location. Thus, when gaming property 104*c* joins the gaming network 100, the universal patron server 102 may logically associate the gaming property 104*c* with the gaming properties 104*a, b*. In another embodiment, a user may logically associate the gaming properties 104*a-c* manually.

Information indicative of the first property group 110*a* may also be stored at any of the nodes within the gaming network 100. In one embodiment, the universal patron database 103 may include data indicative of the plurality of property groups 110*a-c*. In another embodiment, the regional patron databases 107 may include information indicative of logical associations formed between corresponding gaming properties 104. In yet another embodiment, the gaming properties 104*a-c* themselves may store information indicative of the first property group 110*a*. For example, the originating gaming property 104*a* in the first property group 110*a* may have stored on its local server information regarding the other gaming properties 104*b, c* that comprise the first property group 110*a*. The information indicative of the logical associations between gaming properties 104*a-c* may also be duplicated on the nodes of the gaming network 100.

The composition of the first property group 110*a* may be represented and stored in a number of ways. In one embodiment, a number of pointers may be used to associate a software object associated with the first property group 110*a* with software objects representative of the gaming properties 104*a-c*. In another embodiment, data indicative of the first property group 110*a* may be stored in a table or in database entries.

It may be understood that a plurality of property groups 110 may be created in a single gaming network 100, in accordance with one embodiment. These property groups 110 may be stored in a number of different patron databases associated with the respective gaming properties 104, such that, in some embodiments, no single patron database stores information indicative of all of the property groups 110 in the gaming network 100.

At 304, a set of permissions is generated for the first property group 110*a*. The set of permissions may reflect which, if any, patron information may be exchanged among the gaming properties 104*a-c* comprising the first property group 110*a*. For example, the set of permissions may indicate that the gaming properties 104*a-c* of the first property group 110*a* may share patron identifiers and patron bonus information, but may not share financial information, such as marker payments or front money balances. The set of permissions may further reflect different degrees of access to the patron information within any one of the gaming properties 104*a-c*. For example, the set of permissions may indicate that, with respect to certain patrons, only patron identifiers may be shared, while for other patrons, more detailed financial information may be shared.

In one embodiment, the set of permissions may be generated based at least in part on a user's interactions with one of the patron servers. For example, a patron server display may present a user with different types of patron information that may be shared among the gaming properties 104*a-c* comprising the first property group 110*a*, along with a checkbox for each type. The patron server may then generate the set of permissions based at least in part on the types of patron information selected by the user. In another embodiment, an application program may generate the set of permissions automatically based on predetermined criteria.

The set of permissions may be generated and stored at any of the nodes in the gaming network 100. In one embodiment, the set of permissions may be generated at the universal patron server 102 and stored within the universal patron database 103. In another embodiment, sets of permissions for a property group may be generated at a regional patron server 106 and stored in a regional patron database 107. In yet another embodiment, the set of permissions may be generated and stored on one or more of the local servers associated with the gaming properties 104*a-c*. Of course, in different embodiments, the set of permissions may be stored redundantly at different nodes throughout the gaming network 100.

In a nested gaming network, it may be understood that the distribution of patron information between two or more gaming properties 104*a-c* may be governed by more than one set of permissions. In such a network, the least restrictive set of permissions may govern. For example, the set of permissions of the first property group 110*a* may not permit the gaming properties 104*a-c* to share certain financial information, but another set of permissions associated with a smaller property group comprising a subset of the first property group 110*a* may permit the sharing of such financial information among selected gaming properties 104. In such an example, the gaming properties 104 in the smaller property group may share the financial information.

At 306, patron information associated with at least one patron is received from the originating gaming property 104*a*. The patron information may include any of the types of patron information discussed at length above, including financial information, promotional information, personal information and historical preferences. In one embodiment, the patron information includes information indicative of at least one of: an incentive cash balance, a patron bonus, a patron identifier, a patron cash account balance, a marker payment, a front money balance, or a chip purchase voucher. The patron information may be generated in a variety of ways at the originating gaming property 104*a* (as described above), and it may be received from the originating gaming property 104*a* at a certain time interval or in response to a specific event, such as a patron information request.

In one embodiment, the universal patron server 102 may receive and store the patron information. In such an embodiment, the universal patron database 103 may be configured to store a great deal of patron information. In another embodiment, the universal patron server 102 may receive the patron information and store it only temporarily before transmitting it on to the requesting gaming property 104*b*, as described below. In this embodiment, although the universal patron server 102 may act as an intermediary between the originating gaming property 104*a* and the requesting gaming property 104*b*, the universal patron database 103 need not store massive amounts of patron information. Instead, a regional patron database 107 or local servers associated with the gaming properties 104 may store much of the patron information.

In one embodiment, all of the patron information generated at the originating gaming property 104*a* may be transmitted routinely to the universal patron database 103 for storage. In such an embodiment, a local copy of the patron information may or may not be stored on a local server associated with the originating gaming property 104*a*. In another embodiment, only the patron information that may be shared in accordance with the set of permissions associated with the first property group 110*a* may be stored at the universal patron database 103. Other patron information that may not be shared with the other gaming properties 104*b, c* in the first property group 110*a* may be kept locally at the originating gaming property 104*a*. In yet another embodiment, the patron information may be received at the universal patron server 102 only in response to a request from the universal patron server 102.

In yet another embodiment, the universal patron server 102 need not receive the patron information from the originating gaming property 104*a* at all. Instead, the patron information may be sent directly from the originating gaming property 104*a* to the requesting gaming property 104*b* based at least in part on the result of the verification act 310. This embodiment may reduce network traffic through the universal patron server 102.

At 308, a request for the patron information is received from the requesting gaming property 104*b*. The request for patron information may be generated at the requesting gaming property 104*b* in response to a variety of triggers. In one embodiment, for example, the requesting gaming property 104*b* may receive a patron club card from a patron. If the patron is not recognized as a local patron of the requesting gaming property 104*b*, the requesting gaming property 104*b* may attempt to obtain patron information associated with the patron. For example, the requesting gaming property 104*b* may attempt to verify the identity of the patron, or may attempt to determine what patron cash accounts are accessible by the patron. In another embodiment, a patron may request access to front money at the requesting gaming property 104*b*, and the requesting gaming property 104*b* may request a front money balance associated with the originating gaming property 104*a*.

The request for patron information may be received at any of the nodes of the gaming network 100. In one embodiment, the universal patron server 102 may receive and process the request for the patron information. In another embodiment, a regional patron server 106 may receive the request for the patron information and, in some embodiments, may forward the request on to the universal patron server 102. In yet another embodiment, the request for the patron information may be received at the originating gaming property 104*a*. For example, the requesting gaming property 104*b* may determine that a patron is associated with the originating gaming property 104*a* and may send a request directly to the originating gaming property 104*a* for certain patron information.

At 310, the request is verified based at least in part on the set of permissions. In one embodiment, the universal patron server 102 receives the request from the requesting gaming property 104*b* (as described above) and compares the requested patron information against the set of permissions. If the requested patron information may be shared in accordance with the set of permissions, then the universal patron server 102 may verify the request. If the requested patron information may not be shared, then the universal patron server 102 may send an indication to the requesting gaming property 104*b* or to the originating gaming property 104*a* that such information may not be shared within the first property group 110*a*. The regional patron server 106 may also perform these acts.

In another embodiment, the originating gaming property 104*a* may receive the request for patron information directly from the requesting gaming property 104*b*. The originating gaming property 104*a* may then forward the request on to the universal patron server 102 for verification. The universal patron server 102 may then compare the requested patron information against the set of permissions and verify the request accordingly.

In yet another embodiment, the requesting gaming property 104*b* may first send the request to the universal patron server 102 for verification. Upon verification, the requesting gaming property 104*b* may then send the verified request directly to the originating gaming property 104*a*. The originating gaming property 104*a* may then respond to this verified request with the requested patron information, as described with respect to act 312.

In another embodiment, the request may be verified at the requesting gaming property 104*b* or the originating gaming property 104*a* based on information requested from the universal patron server 102 or a regional patron server 106. For example, the requesting gaming property 104*b* may request information indicative of the set of permissions from the universal patron server 102, and may then perform verification of the request itself. In a peer-to-peer embodiment, the request may be verified at the requesting gaming property 104*b* or the originating gaming property 104*a* based on a locally accessible set of permissions.

At 312, if the request is verified, the patron information is transmitted to the requesting gaming property 104*b*. In one embodiment, wherein the universal patron server 102 itself stores the patron information, the universal patron server 102, upon verifying the request, may transmit the requested patron information to the requesting gaming property 104*b*. The patron information may then be at least temporarily stored at a local server or other computing device associated with the requesting gaming property 104*b*.

In another embodiment, the originating gaming property 104*a* may receive the request from the requesting gaming property 104*b* and, upon verification, may transmit the patron information from a local server to the requesting gaming property 104*b*.

The above embodiment is described in terms of a request for particular patron information. However, in other embodiments, the patron information may be routinely distributed to local servers of the gaming properties 104*a-c*. The above acts may be modified accordingly. In such an embodiment, a copy of the current patron information for the first property group 110*a* may be found at each local server and accessing the patron information from any gaming property 104*a-c* would be relatively fast, without great network lag.

Once the patron information has been transmitted to the requesting gaming property 104*b*, it may be used in a variety of ways, depending on the patron information. For example, in one embodiment, information regarding a patron cash account may be received at the requesting gaming property 104*b*, and the patron may wager with cash withdrawn from the patron cash account. In another embodiment, the patron may use incentive cash or redeem a patron bonus at the requesting gaming property 104*b*, even though this incentive cash or bonus might have been "earned" at the originating gaming property 104*a*. In yet another embodiment, information regarding a marker payment may be received at the requesting gaming property 104*b*, and the patron may wager with credits associated with the marker payment. In still another embodiment, information regarding the patron identifier may be received at a game device within the requesting gaming property 104*b*, and the game device may thus associate the patron's wagering characteristics with an appropriate patron account.

Description of Another Gaming Network Including a Universal Voucher Database

Figure 4:
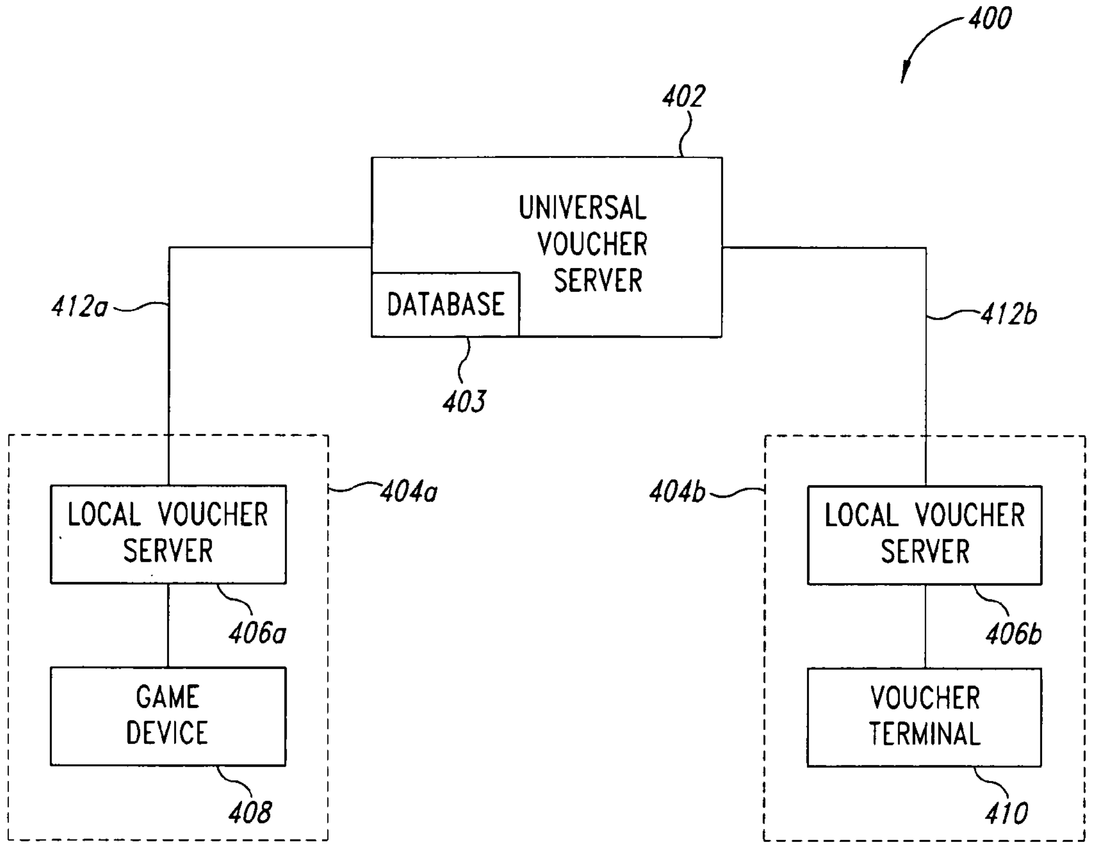
FIG. 4 is a high-level block diagram of a gaming network including a universal voucher server coupled to a plurality of gaming properties, according to one illustrated embodiment.

FIG. 4 illustrates a gaming network 400 including a universal voucher server 402 communicatively coupled to a plurality of gaming properties 404*a, b* (collectively 404). The first gaming property 404*a* may include a local voucher server 406*a* and a game device 408, and the second gaming property 404*b* may include a local voucher server 406*b* and a voucher terminal 410. As illustrated, the gaming network 400 may facilitate voucher redemption at multiple gaming properties 404, as described in greater detail with respect to FIGS. 8 and 9.

The gaming properties 404 may be similar to those gaming properties 104 described at length above with respect to FIG. 1. In one embodiment, the gaming properties 404 may be commonly owned by a corporation. In another embodiment, the gaming properties 404 may be independently owned but may belong to a gaming network 400 to enable universal acceptance of gaming property vouchers (as described in detail below).

In one embodiment, the gaming properties 404 may host at least some form of gaming/gambling. In order to facilitate cashless wagering and cashless disbursements, the gaming properties 404 may also generate documents representing a certain value in cash or credits that may be redeemed at a respective gaming property 404. As used herein, the term "voucher" is a general term referring to such redeemable documents generated by the gaming properties 404. In one embodiment, upon cashing out of a game device (e.g., a slot machine), a patron may receive a voucher that may be redeemed for cash. The patron may then bring the voucher to a cashier or a voucher terminal for redemption. In another embodiment, coupon vouchers may be distributed to patrons by the gaming properties 404. These coupon vouchers may be redeemed for discounts off services provided at the gaming properties 404 or may be redeemed for gaming credits. Many other vouchers may also be generated by the gaming properties 404.

The vouchers generated at the gaming properties 404 may comprise any type of document that is encoded with information that may be input into or scanned by a computing device. In one embodiment, the voucher may include alphanumeric characters that may be scanned or otherwise input into a computing device by an employee of a gaming property 404. In another embodiment, the voucher may include a bar code that may be scanned and processed by a computing device. In yet another embodiment, the voucher may include a radio frequency identification tag that is encoded with information indicative of the voucher. In still another embodiment, the voucher may include a magnetic stripe that is encoded with information indicative of the voucher.

To guard against forgery, each voucher may be associated with a unique voucher identifier stored on the gaming network 400. This voucher identifier may be used by a gaming property 404 upon receiving a voucher to verify that a voucher is valid and has not previously been redeemed. In one embodiment, in order to ensure that the voucher identifier is unique throughout the gaming network 400, the voucher identifier may comprise both a numeric identifier associated with the voucher as well as a gaming property identifier associated with the gaming property 404 that generated the voucher. Thus, even if two gaming properties 404*a, b* use the same numeric identifier for two different vouchers, the voucher identifier will differ due to the differing gaming property identifiers.

In one embodiment, each gaming property 404 may include a local voucher server 406 configured to receive, process and at least temporarily store the voucher identifiers of vouchers generated at the gaming property 404. In one embodiment, the local voucher servers 406 may be further configured to receive, process and at least temporarily store other information indicative of the vouchers. In one embodiment, the voucher identifier may be stored along with a patron identifier associated with the patron that received the voucher. In other embodiments, the information indicative of the voucher may include any of the following: a redemption value of the voucher, a voucher type, a gaming property identifier of the gaming property 404 that generated the voucher, a game device or other location at which the voucher was generated, a time that the voucher was generated and/or distributed, etc. In different embodiments, more or fewer local voucher servers 406 may be deployed at each gaming property 404. For example, the local voucher servers 406 may be omitted, and other computing devices within each gaming property 404 may be coupled directly to the universal voucher server 402.

Each gaming property 404 may further include a plurality of networked computing devices communicatively coupled to the local voucher server 406. These networked computing devices may include game devices (e.g., game device 408), public terminals, employee terminals, voucher terminals (e.g., voucher terminal 410), handheld devices, etc. that may collect/generate information indicative of vouchers. This voucher information may then be forwarded to the local voucher servers 406.

In some embodiments, the local voucher servers 406 may be further configured to generate information indicative of the vouchers. For example, the local voucher servers 406 may generate voucher identifiers for new vouchers and may send information indicative of the new vouchers to the networked computing devices.

The local voucher servers 406 may be implemented in any of a variety of types of hardware. In one embodiment, the local voucher servers 406 may be implemented similarly to the universal patron server 102, as described above with reference to FIG. 2.

In one embodiment, the first gaming property 404*a* may further comprise at least one game device 408 communicatively coupled to the local voucher server 406*a*. Although not illustrated, the second gaming property 404*b* may also include at least one game device. The game device 408 may represent any electronic device that accepts wagers from patrons of the first gaming property 404*a* and returns vouchers to the patrons. In one embodiment, information indicative of the vouchers issued at the game device 408 may be forwarded to the local voucher server 406*a*. The game device 408 may have a variety of configurations, and one example structure and configuration of the game device 408 will be discussed in greater detail with respect to FIGS. 5 and 6.

In other embodiments, the first gaming property 404*a* may not include game devices, but may include any of a number of other networked computing devices communicatively coupled to the local voucher server 406*a* that may generate and/or enable the distribution of vouchers to patrons. Information indicative of the vouchers distributed at these devices may then be forwarded to the local voucher server 406*a*, as described below.

As illustrated, the second gaming property 404*b* may include at least one voucher terminal 410 communicatively coupled to the local voucher server 406*b*. Although not illustrated, the first gaming property 404*a* may also include at least one voucher terminal. The voucher terminal 410 may comprise a computing device for receiving information from a voucher and enabling redemption of at least a portion of a value of the voucher. In one embodiment, the voucher terminal 410 may comprise a networked computer operated by an employee of the second gaming property 404*b*. The employee may accept a voucher from a patron and scan it using the networked computer. Based on a response received from the networked computer, the employee may then redeem the voucher by providing cash or credits equal to at least a portion of a value of the voucher. In another embodiment, the voucher terminal 410 may comprise an automated terminal. A patron may scan a voucher at the automated terminal, and receive cash or access to credits equal to at least a portion of a value of the voucher. In yet another embodiment, a game device may incorporate the functionality of the voucher terminal. For example, the game device 408 may accept a voucher and enable wagering based on a value of the voucher.

The arrangement and configuration of the voucher terminal 410 may be varied in different embodiments. One example configuration for the voucher terminal 410 will be discussed in greater detail with respect to FIG. 7.

As illustrated, the gaming properties 404 may also be networked together such that information indicative of vouchers generated at the gaming properties 404 may be exchanged. In one embodiment, logical connections 412*a, b* (collectively 412) may be formed between the gaming properties 404 and the universal voucher server 402. This gaming network 400, including the gaming properties 404, the universal voucher server 402 and associated logical connections 412, may comprise any of a variety of networks and related hardware and/or software. The gaming network 400 may comprise a wired or wireless enterprise-wide computer network, intranet, extranet or the Internet. Other embodiments may be implemented in other types of communication networks, including telecommunications networks, cellular networks, and other mobile networks. The illustrated logical connections 412 may be wired or wireless and may employ any of a variety of network protocols.

In one embodiment, the gaming properties 404 may be coupled to the gaming network 400 via their respective local voucher servers 406. In other embodiments, other computing devices associated with the gaming properties 404 may comprise nodes in the gaming network 400.

As illustrated, in one embodiment, the gaming properties 404 may be communicatively coupled directly or indirectly to a universal voucher database 403 hosted on the remote universal voucher server 402. In other embodiments, the gaming network 400 may not include a universal voucher server 402, and the gaming properties 404 may instead be communicatively coupled directly to each other in a peer-to-peer networking architecture.

In one embodiment, the universal voucher server 402 may receive information indicative of vouchers generated at the gaming properties 404 coupled (directly or indirectly) thereto. For example, the local voucher servers 406 may send voucher information to the universal voucher server 402. The universal voucher database 403 may then store the voucher information received from the gaming properties 404. In some embodiments, the universal voucher database 403 may comprise the sole repository for the voucher information. However, in other embodiments, redundant storage may be implemented. For example, the information indicative of vouchers generated at the first gaming property 404*a* may be stored at the local voucher server 406*a* as well as the universal voucher database 403.

In some embodiments, the universal voucher server 402 may be further configured to forward voucher information to gaming properties 404 coupled thereto. For example, information indicative of vouchers generated at the first gaming property 404*a* may be forwarded by the universal voucher server 402 to the second gaming property 404*b*. This method of distributing voucher information is discussed in greater detail with reference to FIGS. 8 and 9.

More complicated gaming networks may be implemented in other embodiments. For example, regional voucher servers similar to the regional patron servers described above may be positioned hierarchically between the gaming properties 404 and the universal voucher server 402.

In one embodiment, the universal voucher server 402 may be located remotely from the gaming properties 404. In another embodiment, the universal voucher server 402 may be located at any one of the gaming properties 404, and the other gaming properties 404 may be communicatively coupled directly to that particular gaming property.

The universal voucher database 403 may be hosted on any of a variety of types of hardware. In one embodiment, the universal voucher server 402 may be implemented similarly to the universal patron server 102, as described above with reference to FIG. 2.

Description of a Suitable Game Device

Figure 5:
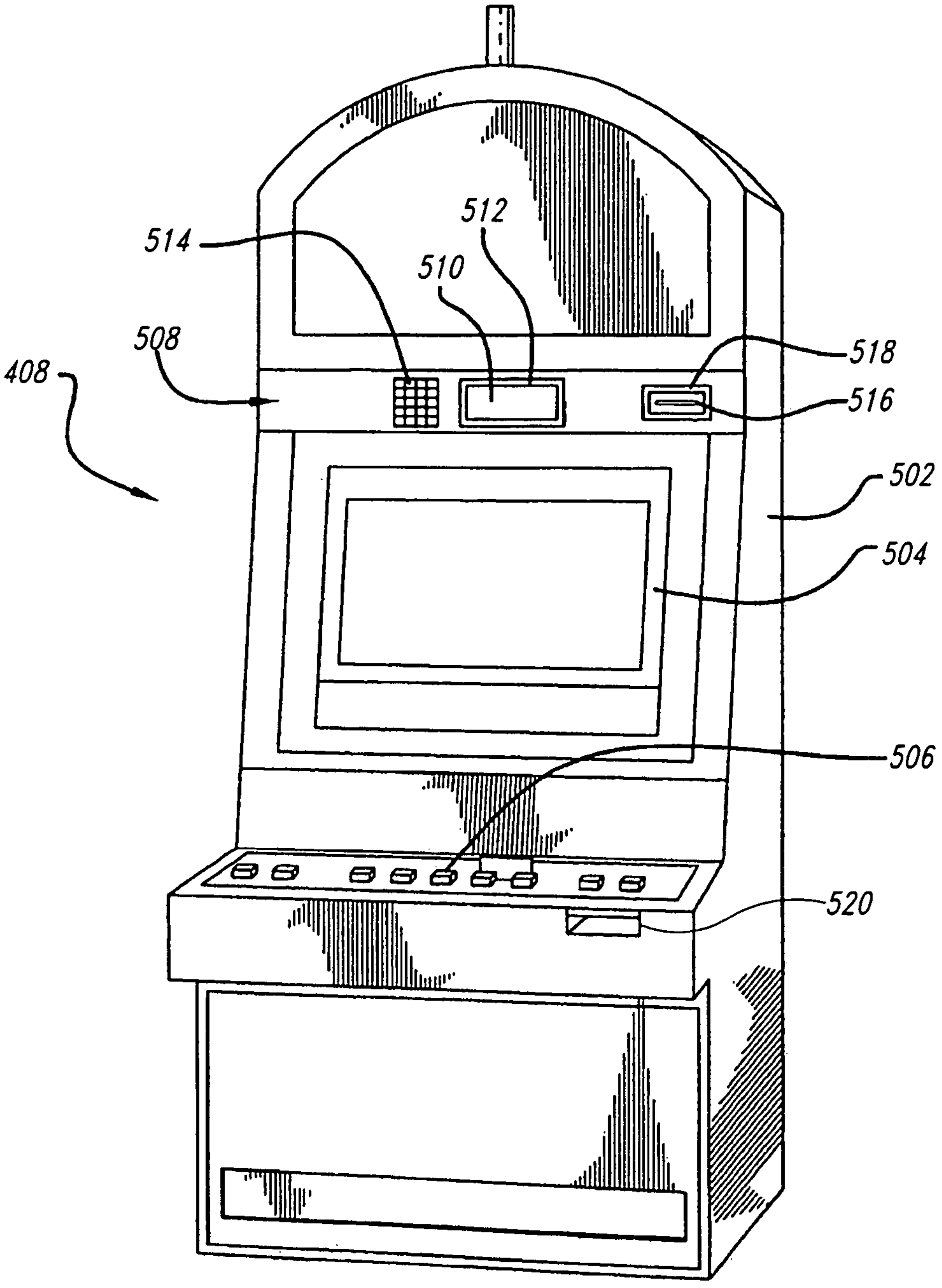
FIG. 5 is a perspective view of a game device for use in the gaming network of FIG. 4, according to one illustrated embodiment.

Referring to FIG. 5, one example embodiment of a game device 408 will be described in greater detail. As illustrated, the game device 408 includes a housing 502, a game display 504, a plurality of player-activated buttons 506, and a player interaction system 508. The housing 502 may be a self-standing unit that is generally rectangular in shape. In other embodiments, the housing may comprise a slant-top, bar-top, or table-top style cabinet. However, any shaped housing may be used with embodiments of the game device 408.

The game display 504 may present one or more games of chance, such as, but not limited to, mechanical slots, video slots, video keno, video poker, mechanical or video roulette, Class II bingo, lottery, craps, blackjack, a mechanical or video representation of a wheel game, etc. One example game of chance is BLAZING 7's by Bally Technologies, Inc. In other embodiments, the game display 504 may present games of skill or games of chance involving some player skill. In one embodiment, the game display 504 is a CRT or a panel display, such as, but not limited to, liquid crystal, plasma, electroluminescent, vacuum fluorescent, field emission, or any other type of panel display. Additionally, the game display 504 may also include a touch screen or touch glass system.

As shown in FIG. 5, one embodiment of the player interaction system 508 comprises a graphics display 510, a touch bezel 512, a keypad 514, a patron club card reader 516, and a card reader bezel 518. The graphics display 510 may display any visual screen images (e.g., pictures, characters, symbols) and video images that have been converted for compatibility with digital or computer manipulation, transport and storage. The player interaction system 508 may be positioned above the game display 504, as shown in FIG. 5. Alternatively, the player interaction system 508 may be positioned below or next to the game display 504 or in any other location.

In one embodiment, the patron club card reader 516 may read magnetic stripe cards. In this regard, the patron club card reader 516 may be used to read patron club cards issued by the gaming property 404, gaming property employee cards, smart cards, and the like. Generally, the patron club card reader 516 may monitor and track player and employee activity each time a patron or employee inserts his or her card into the patron club card reader 516.

The game device 408 may further include a voucher printer (not visible in FIG. 5) that prints to and then dispenses vouchers via a voucher slot 520. The voucher printer may comprise any of a variety of printers configured to encode vouchers that may be redeemed by a patron. For example, in one embodiment, the voucher printer may not print human-readable information, but instead may transmit electromagnetic signals to a radio frequency identification tag on a voucher in order to encode information to the voucher. Of course, in other embodiments, other mechanisms for paying out patrons may also be provided, including a coin hopper, a device for electronic funds transfer, etc.

Figure 6:
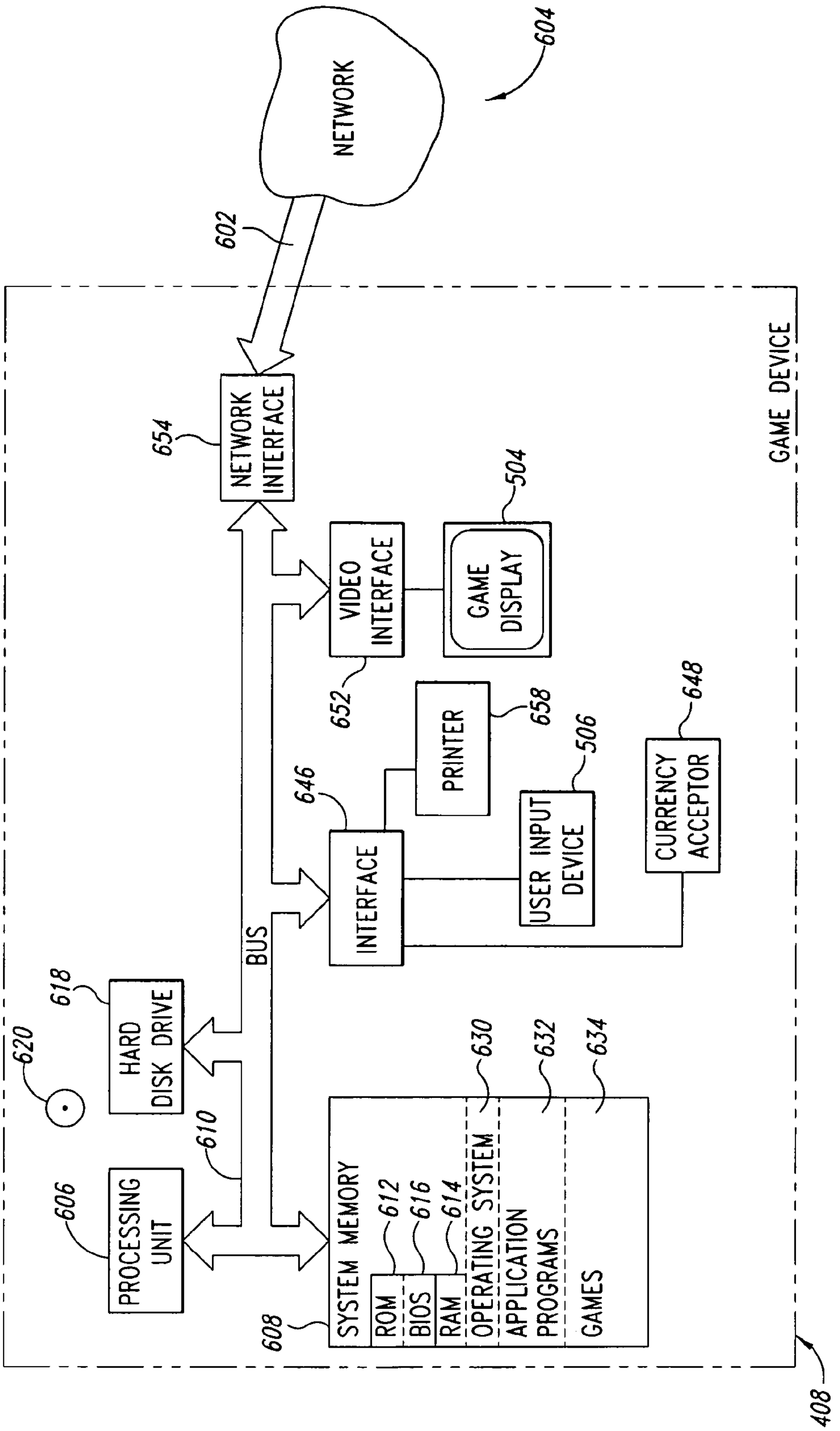
FIG. 6 is a schematic view of the game device of FIG. 5.

With reference to FIG. 6, the internal structure of the game device 408 may be described in greater detail. Although not required, the embodiments will be described in the general context of computer-executable instructions, such as program application modules, objects, or macros being executed by a computer. The embodiments can be practiced in distributed computing environments where tasks or modules are performed by remote processing devices, which are linked through a communications network. In a distributed computing environment, program modules may be located in both local and remote memory storage devices.

FIG. 6 shows a game device 408. The game device 408 is coupled by at least one communication channel/logical connection 602 to a network 604. This logical connection 602 may serve as the logical connection illustrated in FIG. 4 communicatively coupling the game device 408 to the local voucher server 406*a*.

The game device 408 may take the form of a conventional PC, which includes a processing unit 606, a system memory 608 and a system bus 610 that couples various system components including the system memory 608 to the processing unit 606. The game device 408 will at times be referred to in the singular herein, but this is not intended to limit the embodiments to a single processor. Non-limiting examples of commercially available systems include, but are not limited to, an 80x86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processing unit 606 may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks shown in FIG. 6 are of conventional design. As a result, such blocks need not be described in further detail herein, as they will be understood by those skilled in the relevant art.

The system bus 610 can employ any known bus structures or architectures, including a memory bus with memory controller, a peripheral bus, and a local bus. The system memory 608 includes read-only memory ("ROM") 612 and random access memory ("RAM") 614. A basic input/output system ("BIOS") 616, which can form part of the ROM 612, contains basic routines that help transfer information between elements within the game device 408, such as during start-up.

The game device 408 may also include a hard disk drive 618 for reading from and writing to a hard disk 620. The hard disk drive 618 may communicate with the processing unit 606 via the system bus 610. The hard disk drive 618 may also include an interface or controller (not shown) coupled between it and the system bus 610, as is known by those skilled in the relevant art. The hard disk drive 618 provides nonvolatile storage for computer-readable instructions, data structures, program modules and other data for the game device 408. Although the depicted game device 408 employs a hard disk 620, those skilled in the relevant art will appreciate that other types of computer-readable media that can store data accessible by a computer may be employed, such as magnetic cassettes, flash memory cards, Bernoulli cartridges, RAMs, ROMs, smart cards, optical disks, magnetic disks, etc.

Program modules can be stored in the system memory 608, such as an operating system 630, one or more application programs 632, and one or more games 634. The system memory 608 may also include communications programs permitting the game device 408 to access and exchange data over networks.

While shown in FIG. 6 as being stored in the system memory 608, the operating system 630, application programs 632, and games 634 can be stored on the hard disk 620 of the hard disk drive 618.

A patron can interact with the game device 408 through input devices such as player-activated buttons 506. Other input devices can include a touch-sensitive bezel 512, joystick, game pad, tablet, scanner, etc. These and other input devices may be connected to the processing unit 606 through an interface 646 such as a universal serial bus ("USB") interface that couples to the system bus 610, although other interfaces such as a parallel port, a game port or a wireless interface or a serial port may be used.

The interface 646 may further be coupled to a currency acceptor 648 configured to accept currency from a patron. In one embodiment, the currency acceptor 648 may include one or more coin slots, bill acceptors, etc. In another embodiment, the game device 408 may include a card slot for receiving a financial card issued by a financial institution, via which credits may be purchased.

The interface 646 may further be coupled to a voucher printer 650. As described above, the voucher printer 650 may comprise any of a variety of printers configured to encode and dispense vouchers. In one embodiment, the voucher printer 650 may print vouchers in accordance with instructions received via a network interface 654.

A game display 504 or other display device may be coupled to the system bus 610 via a video interface 652, such as a video adapter.

The game device 408 operates in a networked environment using one or more logical connections 602 to communicate with one or more remote computers, servers and/or devices through the network 604. These logical connections may facilitate any known method of permitting computers to communicate, such as through one or more LANs and/or WANs, such as the Internet. Such networking environments are well known in wired and wireless enterprise-wide computer networks, intranets, extranets, and the Internet. Other embodiments include other types of communication networks including telecommunications networks, cellular networks and other mobile networks.

In one embodiment, the network interface 654 (communicatively linked to the system bus 610) may be used for establishing communications over the logical connection 602. In a networked environment, program modules, application programs, or games, or portions thereof, can be stored outside of the game device 408 (not shown). Those skilled in the relevant art will recognize that the network connections shown in FIG. 6 are only some examples of ways of establishing communications between computers, and other connections may be used.

Further information regarding the potential configurations for the game device 408 may be found in commonly assigned, co-pending U.S. patent application Ser. No. 12/112,231, titled GAMING DEVICE HAVING TWO CARD READERS, filed on Apr. 30, 2008, the contents of which are hereby incorporated herein in their entirety.

Description of a Suitable Voucher Terminal

Figure 7:
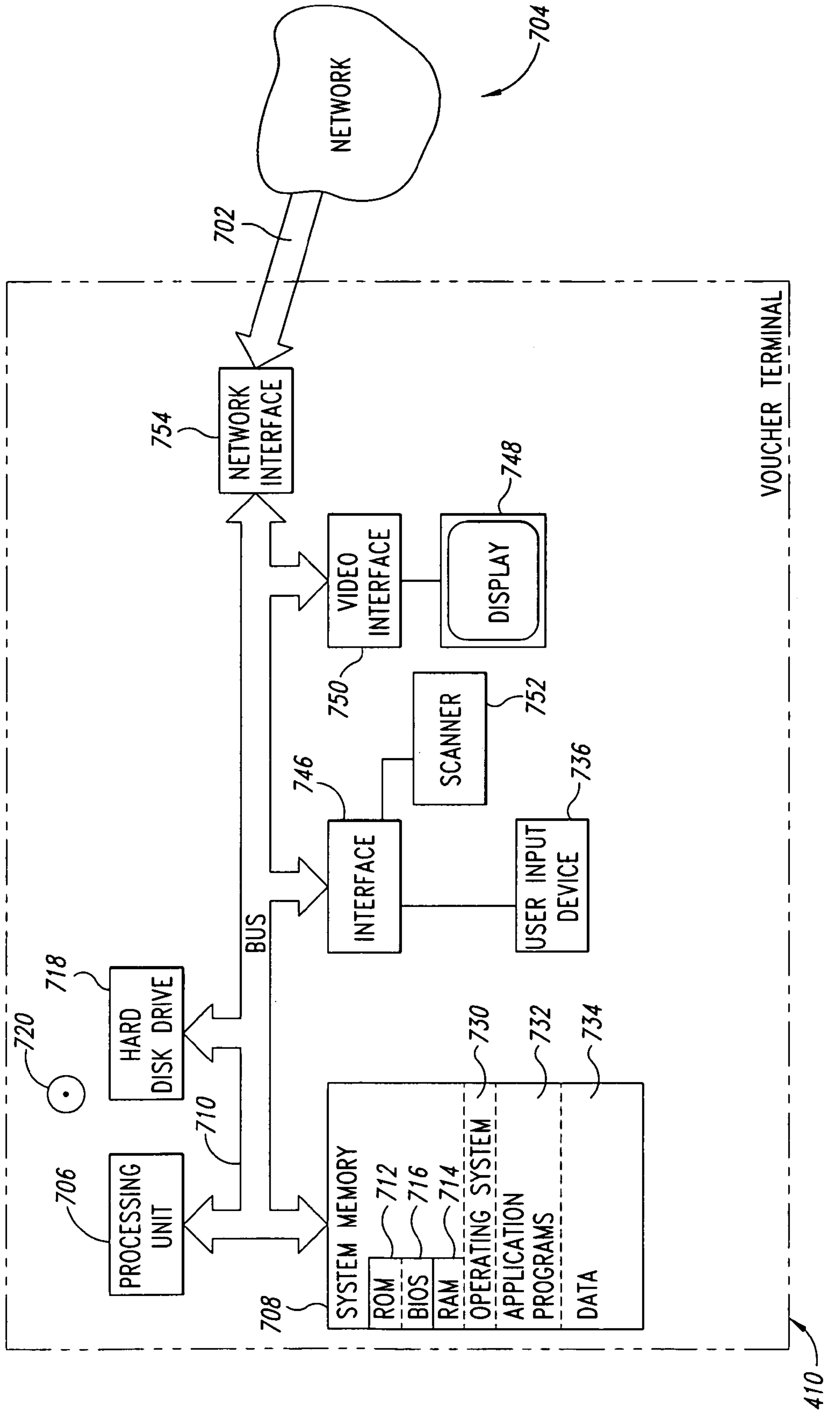
FIG. 7 is a schematic view of a voucher terminal for use in the gaming network of FIG. 4, according to one illustrated embodiment.

FIG. 7 and the following discussion provide a brief, general description of a suitable voucher terminal 410. In other embodiments, the voucher terminal 410 may comprise a game device configured similarly to the game device 408 described with reference to FIGS. 5 and 6. Although not required, the embodiments will be described in the general context of computer-executable instructions, such as program application modules, objects, or macros being executed by a computer. The embodiments can be practiced in distributed computing environments where tasks or modules are performed by remote processing devices, which are linked through a communications network. In a distributed computing environment, program modules may be located in both local and remote memory storage devices.

FIG. 7 shows a voucher terminal 410. The voucher terminal 410 is coupled by at least one communication channel/logical connection 702 to a network 704. This logical connection 702 may serve as the logical connection illustrated in FIG. 4 communicatively coupling the local voucher server 406*b* to the voucher terminal 410.

The voucher terminal 410 may take the form of a conventional PC, which includes a processing unit 706, a system memory 708 and a system bus 710 that couples various system components including the system memory 708 to the processing unit 706. The voucher terminal 410 will at times be referred to in the singular herein, but this is not intended to limit the embodiments to a single processing unit. Non-limiting examples of commercially available systems include, but are not limited to, an 80x86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processing unit 706 may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks shown in FIG. 7 are of conventional design. As a result, such blocks need not be described in further detail herein, as they will be understood by those skilled in the relevant art.

The system bus 710 can employ any known bus structures or architectures, including a memory bus with memory controller, a peripheral bus, and a local bus. The system memory 708 includes read-only memory ("ROM") 712 and random access memory ("RAM") 714. A basic input/output system ("BIOS") 716, which can form part of the ROM 712, contains basic routines that help transfer information between elements within the voucher terminal 410, such as during start-up.

The voucher terminal 410 may also include a hard disk drive 718 for reading from and writing to a hard disk 720. The hard disk drive 718 may communicate with the processing unit 706 via the system bus 710. The hard disk drive 718 may further include an interface or controller (not shown) coupled between it and the system bus 710, as is known by those skilled in the relevant art. The drive 718 provides nonvolatile storage of computer-readable instructions, data structures, program modules and other data for the voucher terminal 410. Although the depicted voucher terminal 410 employs a hard disk 720, those skilled in the relevant art will appreciate that other types of computer-readable media that can store data accessible by a computer may be employed, such as magnetic cassettes, flash memory cards, Bernoulli cartridges, RAMs, ROMs, smart cards, optical or magnetic disks, etc.

Program modules can be stored in the system memory 708, such as an operating system 730, one or more application programs 732, and data 734. The system memory 708 may also include communications programs permitting the voucher terminal 410 to access and exchange data over the network 704.

While shown in FIG. 7 as being stored in the system memory 708, the operating system 730, application programs 732, and data 734 can be stored on the hard disk 720 of the hard disk drive 718.

A user can enter commands and information into the voucher terminal 410 through a user input device 736, such as a touch screen or keyboard and/or a pointing device such as a mouse. Other input devices can include a microphone, joystick, game pad, tablet, etc. These and other user input devices may be connected to the processing unit 706 through an interface 746 such as a universal serial bus ("USB") interface that couples to the system bus 710, although other interfaces such as a parallel port, a game port or a wireless interface or a serial port may be used. A display 748 or other display device may also be coupled to the system bus 710 via a video interface 750, such as a video adapter. Although not shown, the voucher terminal 410 can include other output devices, such as speakers, printers, etc.

The voucher terminal 410 may further include a scanner 752 coupled to the interface 746. The scanner 752 may be configured to read computer-readable information encoded on a voucher. The voucher terminal 410 may also include a cash dispenser (not shown) for dispensing cash to a patron equal to at least a portion of a value of a voucher read by the scanner 752.

The voucher terminal 410 operates in a networked environment using one or more logical connections 702 to communicate with one or more remote computers, servers and/or devices through the network 704. These logical connections may facilitate any known method of permitting computers to communicate, such as through one or more LANs and/or WANs, such as the Internet. Such networking environments are well known in wired and wireless enterprise-wide computer networks, intranets, extranets, and the Internet. Other embodiments include other types of communication networks including telecommunications networks, cellular networks, paging networks, and other mobile networks.

In one embodiment, a network interface 754 (communicatively linked to the system bus 710), may be used for establishing communications over the logical connection 702. In a networked environment, program modules, application programs, or data, or portions thereof, can be stored outside of the voucher terminal 410 (not shown). Those skilled in the relevant art will recognize that the network connections shown in FIG. 7 are only some examples of ways of establishing communications between computers, and other connections may be used.

Discussion of a Method of Redeeming Vouchers According to One Embodiment

Figure 8:
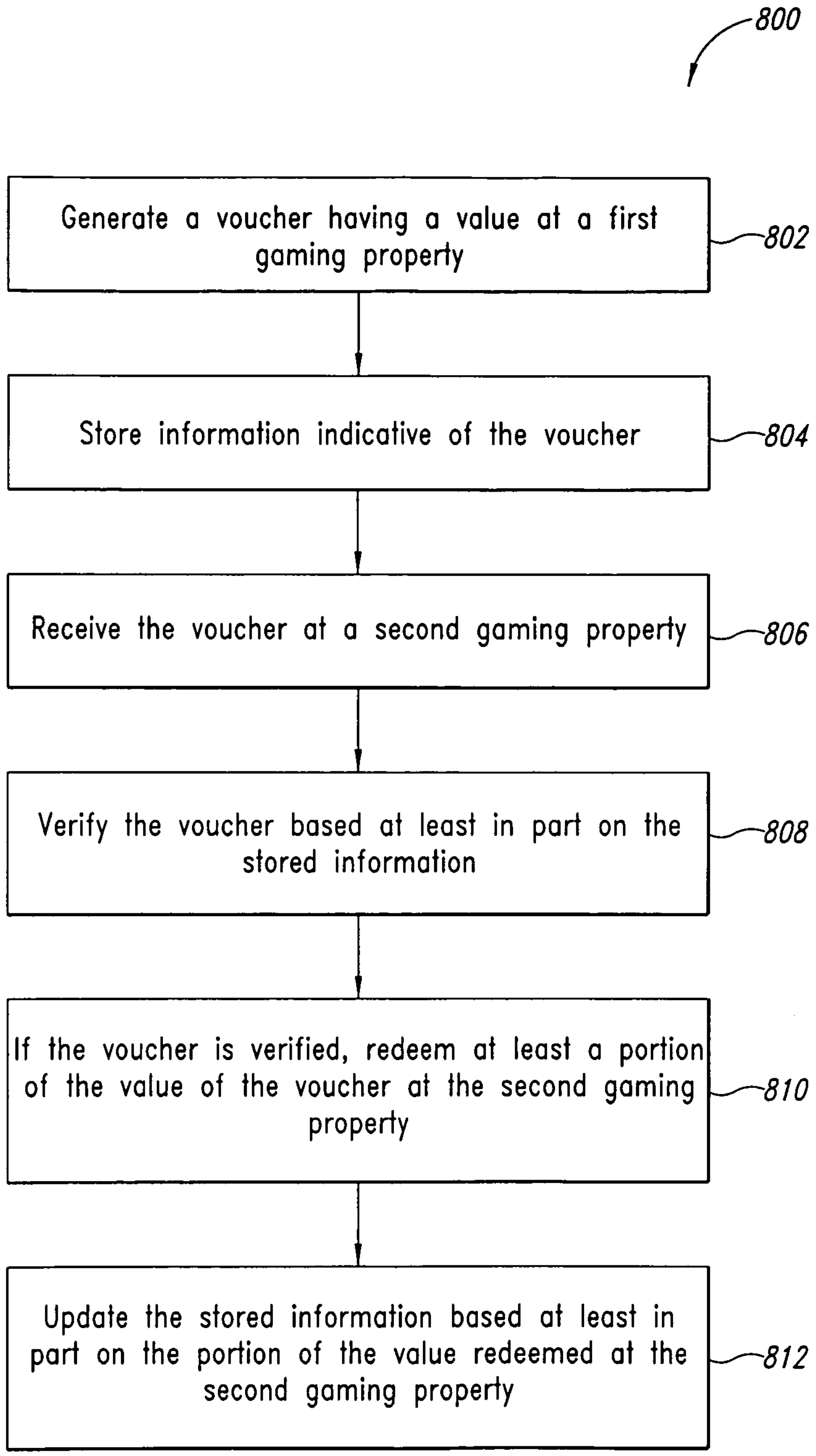
FIG. 8 is a flow diagram illustrating a method for redeeming vouchers in a gaming network, according to one illustrated embodiment.

FIG. 8 illustrates a flow diagram for a method 800 of redeeming vouchers in a gaming network according to one embodiment. This method will be discussed in the context of the gaming network 400 illustrated in FIG. 4. However, it may be understood that the acts disclosed herein may also be executed in different gaming networks in accordance with the described method.

The method begins at act 802, when a voucher having a value is generated at a first gaming property 404*a*. In one embodiment, the voucher may comprise a cash voucher received from the game device 408 when a patron cashes out. Of course, as described above, the voucher may represent any of a variety of documents redeemable at the first gaming property 404*a* for some value in cash or credits. For example, the voucher may also comprise a coupon voucher that doubles a wager made at a table game. Other redeemable vouchers may be generated in other embodiments.

In one embodiment, the voucher may be generated in response to a triggering event. For example, the voucher may be generated at the game device 408 when a patron cashes out. The voucher may also be generated by an employee of the first gaming property 404*a* as a reward for a patron. In another embodiment, a number of vouchers may be generated during a single run for subsequent distribution. For example, a large number of coupon vouchers may be generated and subsequently handed out or sent via mail to patrons.

In one embodiment, the voucher may be encoded with information indicative of the voucher. For example, as described above, the voucher may be encoded with a voucher identifier. In another embodiment, the voucher may be encoded with other information, such as: a redemption value of the voucher, a patron identifier associated with the patron that receives the voucher, a voucher type, a gaming property identifier of the first gaming property 404*a*, an identifier of the game device 408, a time that the voucher was issued, etc.

The information that is encoded on the voucher may originate at any node in the gaming network 400. In one embodiment, the voucher may be generated at the voucher printer 658 of the game device 408 independently of any other computing devices. To ensure a unique voucher identifier, different algorithms may be used. For example, the voucher identifier may be generated based at least in part on a time that the voucher was generated and on a patron identifier associated with a patron to whom the voucher was issued. In another embodiment, the information on the voucher may be sent from the local voucher server 406*a* to the game device 408, and the voucher may then be generated at the game device 408 using this information. For example, when a patron cashes out of the game device 408, the game device 408 may send a request to the local voucher server 406*a* for new voucher information. The local voucher server 406*a* may in turn create a new voucher identifier and other information that may be encoded on the voucher. The local voucher server 406*a* may then send at least some of this voucher information back to the game device 408 for generating the voucher. In yet another embodiment, the local voucher server 406*a* may act as an intermediary. The local voucher server 406*a* may simply forward the request from the game device 408 on to the universal voucher server 402 and then forward the information for encoding the voucher from the universal voucher server 402 back to the game device 408.

At 804, information indicative of the voucher is stored. The stored voucher information may be a subset or superset of the information described above that is encoded on the voucher. In one embodiment, the stored information may only comprise the voucher identifier. In another embodiment, the stored information may further include a code indicative of a redemption status of the voucher. For example, the stored information may indicate that a voucher is: Redeemed, Partially Redeemed, Pending Redemption, Void or Not Redeemed/Available. In yet another embodiment, the stored information may include any of the following: a redemption value of the voucher, a patron identifier associated with a patron that received the voucher, a voucher type, a gaming property identifier of the first gaming property 404*a*, an identifier of the game device 408, a time that the voucher was issued, etc.

The information indicative of the voucher may be stored on any of the nodes in the gaming network 400, and different voucher information may be stored at different locations. In one embodiment, the voucher information may be stored in the universal voucher database 403. In another embodiment, the voucher information may be stored on the local voucher server 406*a*. This voucher information may or may not be duplicative of voucher information stored on the universal voucher database 403. In one embodiment, for example, the universal voucher database 403 may store a subset of the voucher information stored on the local voucher server 406*a*. In yet another embodiment, the voucher information may be stored on the local voucher servers 406*a* and 406*b*. For example, the universal voucher database 403 may propagate the voucher information to all local voucher servers 406 communicatively coupled thereto, such that the voucher information is easily accessible at each gaming property 404.

In one embodiment, the voucher information may be transmitted from the game device 408 to the local voucher server 406*a* upon generation of the voucher. The local voucher server 406*a* may then forward the information on to the universal voucher database 403 for storage. In another embodiment, as described above, the information encoded on the voucher may be generated at the local voucher server 406*a*. The voucher information may then be stored at the local voucher server 406*a* or forwarded to the universal voucher database 403 for storage. In yet another embodiment, voucher information stored on the local voucher server 406*a* may be periodically uploaded to the universal voucher database 403.

At 806, the voucher is received at a second gaming property 404*b*. In one embodiment, having received the voucher at the first gaming property 404*a*, a patron may carry the voucher to the second gaming property 404*b*.

The voucher may be received at the second gaming property 404*b* at any of a plurality of computing devices configured to read at least some of the information encoded on the voucher and to enable redemption of at least a portion of a value of the voucher. In one embodiment, the voucher may be received at the voucher terminal 410. In another embodiment, a game device 408 may receive the voucher and incorporate some of the functionality of the voucher terminal.

At 808, the voucher is verified based at least in part on the stored information. In one embodiment, to increase the security of voucher redemption, the second gaming property 404*b* may initiate an attempt to verify the voucher received there. This verification process may include comparing a voucher identifier encoded on the voucher with a voucher identifier stored on the gaming network 400. In addition, other information stored on the gaming network 400 (such as a redemption status) may also be checked.

The second gaming property 404*b* may first attempt to verify the voucher against information stored in the local voucher server 406*b*. The local voucher server 406*b* may then determine whether information indicative of the voucher is stored thereon. If not, the local voucher server 406*b* may forward the request on to the universal voucher server 402. The universal voucher server 402 may then compare the information received from the local voucher server 406*b* against the voucher information stored within the universal voucher database 403. If the voucher (or at least some portion of the voucher's value) has not yet been redeemed, the universal voucher server 402 may then verify the voucher and send a corresponding notification to the second gaming property 404*b*. This notification may simply include an indication that the voucher is valid. However, in other embodiments, the notification may include at least some of the voucher information stored on the universal voucher database 403, including information indicative of an unredeemed value of the voucher.

In another embodiment, upon receiving the request for verification, the universal voucher server 402 may request voucher information from the local voucher server 406*a*. The universal voucher server 402 may then compare the information received from the second gaming property 404*b* against the voucher information stored on the local voucher server 406*a*.

In yet another embodiment, upon receiving the request for verification, the universal voucher server 402 may simply forward the request on to the local voucher server 406*a*. The local voucher server 406*a* may then compare the information received from the second gaming property 404*b* against the voucher information stored on the local voucher server 406*a*. If the verification is successful, the local voucher server 406*a* may send an appropriate notification via the universal voucher server 402 back to the local voucher server 406*b*.

In still another embodiment, the universal voucher server 402 may forward voucher information stored in the universal voucher database 403 or on the local voucher server 406*a* to the second gaming property 404*b*, and the second gaming property 404*b* itself may perform the verification.

In yet another embodiment, the local voucher server 406*b* may forward a request for verification directly to the local voucher server 406*a* in a peer-to-peer environment.

At 810, if the voucher is verified in act 808, at least a portion of the value of the voucher is redeemed at the second gaming property 404*b*. In one embodiment, having received verification at the second gaming property 404*b*, the voucher may be at least partially redeemed. For example, the voucher terminal 410 may dispense cash up to the redeemable value of the voucher. In another embodiment, an employee of the second gaming property 404*b* may dispense cash to a patron up to the redeemable value of the voucher. In yet another embodiment, a game device may add credits for wagering up to the redeemable value of the voucher.

At 812, the stored information is updated based at least in part on the portion of the value redeemed at the second gaming property 404*b*. In order to help prevent the redemption of a single voucher at multiple gaming properties, the stored voucher information may be updated when the voucher is at least partially redeemed. In one embodiment, the voucher terminal 410 may send a redemption indication to the local voucher server 406*b*. The local voucher server 406*b* may then forward this redemption indication on to the universal voucher server 402 to update the universal voucher database 403.

As described above, the information indicative of the voucher may be stored on any of the nodes in the gaming network 400. Thus, wherever this information was originally stored, the stored information may be updated appropriately based at least in part on the at least a portion of the value of the voucher that has been redeemed. In one embodiment, a record indicative of where and when the voucher was redeemed may also be stored.

Figure 9:
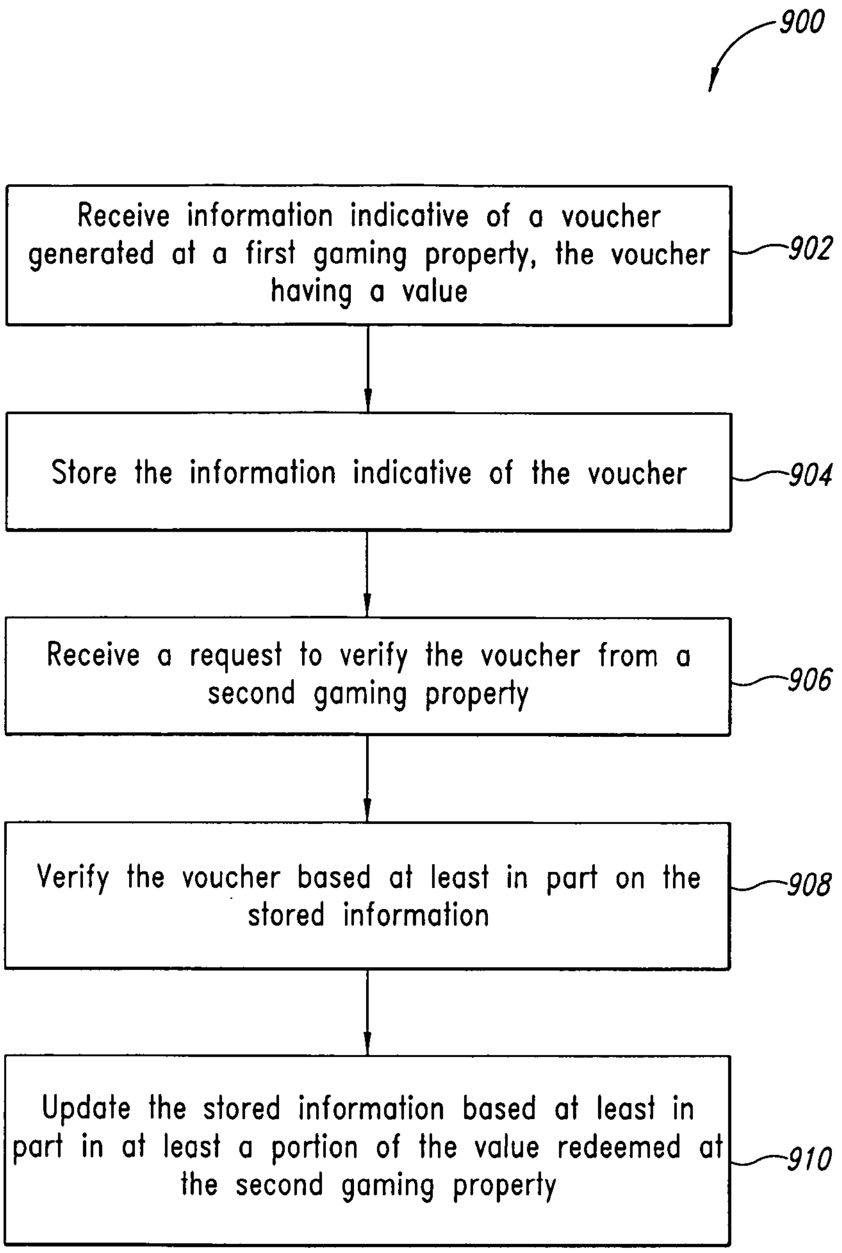
FIG. 9 is a flow diagram illustrating another method for redeeming vouchers in a gaming network, according to yet another illustrated embodiment.

Discussion of Another Method of Redeeming Vouchers According to One Embodiment FIG. 9 illustrates a flow diagram for a method 900 of redeeming vouchers in a gaming network according to one embodiment. This method will be discussed in the context of the gaming network 400 illustrated in FIG. 4, and the acts will be described as executed by the universal voucher server 402. However, it may be understood that the acts disclosed herein may also be executed in different gaming networks and by other nodes in the gaming network 400 in accordance with the described method.

The method begins at act 902, when information indicative of a voucher generated at a first gaming property 404*a* is received at the universal voucher server 402, the voucher having a value. As described above, the voucher may represent any of a variety of documents redeemable at the first gaming property 404*a*. In one embodiment, the voucher may be generated at a game device 408 in the first gaming property 404*a*. Information indicative of the voucher may then be transferred from the game device 408 to the local voucher server 406*a*, and this information may be forwarded by the local voucher server 406*a* to the universal voucher server 402.

At 904, the information indicative of the voucher is stored in the universal voucher server 402. In one embodiment, this voucher information may be stored in the universal voucher database 403. The stored information may or may not be duplicative of voucher information stored on the local voucher servers 406*a* or 406*b*.

At 906, a request to verify the voucher is received from a second gaming property 404*b*. In one embodiment, the voucher may be scanned at a voucher terminal 410. The voucher terminal 410 may send a request to verify the voucher to the local voucher server 406*b*, and this verification request may be forwarded from the local voucher server 406*b* to the universal voucher server 402.

At 908, the voucher is verified based at least in part on the stored information. This verification process may be completed in a variety of ways. In one embodiment, the universal voucher server 402 may compare voucher information stored on the universal voucher database 403 with information received in the request to verify the voucher. Based on this comparison, the universal voucher server 402 may determine whether or not to verify the voucher.

If successful, verification of the voucher may then be transmitted to the second gaming property 404*b*, and more particularly to the local voucher server 406*b*. This transmission may further include information indicative of an unredeemed value of the voucher (for example, if the voucher had been previously partially redeemed).

At 910, the stored information is updated based at least in part on a portion of the value redeemed at the second gaming property 404*b*. In one embodiment, the voucher terminal 410 may send a redemption indication to the local voucher server 406*b*. The local voucher server 406*b* may then forward this redemption indication on to the universal voucher server 402. In another embodiment, upon receiving the verification request at act 906, the universal voucher server 402 may itself update the stored voucher information to indicate that the voucher has been redeemed. This may comprise changing a redemption status code or simply deleting the voucher from the universal voucher database 403.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof, and that designing the circuitry and/or writing the code for the software and or firmware would be well within the skill of one of ordinary skill in the art in light of this disclosure.

When logic is implemented as software and stored in memory, one skilled in the art will appreciate that logic or information can be stored on any computer readable medium for use by or in connection with any processor-related system or method. In the context of this document, a memory is a computer readable medium that is an electronic, magnetic, optical, or other physical device or means that contains or stores a computer and/or processor program. Logic and/or the information can be embodied in any computer readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer readable medium" can be any means that can store, communicate, propagate, or transport the program associated with logic and/or information for use by or in connection with the instruction execution system, apparatus, and/or device. The computer readable medium can be, for example, but is not limited to, an electronic, magnetic, optical, electromagnetic, infrared, or semiconductor system, apparatus, device, or propagation medium. More specific examples (a nonexhaustive list) of the computer readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

The various embodiments described above can be combined to provide further embodiments. From the foregoing it will be appreciated that, although specific embodiments have been described herein for purposes of illustration, various modifications may be made without deviating from the spirit and scope of the teachings. Accordingly, the claims are not limited by the disclosed embodiments.

We claim:

1. A computer-implemented method for distributing patron information in a gaming environment, the method comprising:

logically associating by at least one patron server a first plurality of gaming properties to create a first property group based at least in part on a first set of governmental laws that govern the first plurality of gaming properties, each gaming property of the first plurality of gaming properties is a respective tangible property where at least one patron at the respective tangible property engages in at least one form of at least one of gaming or gambling;

logically associating by at least one patron server a second plurality of gaming properties to create a second property group based at least in part on a second set of governmental laws that govern the second plurality of gaming properties, the second plurality of gaming properties different from the first plurality of gaming properties, each gaming property of the second plurality of gaming properties is a respective one of the first plurality of gaming properties that are respective tangible properties;

generating by the at least one patron server a first set of permissions for the first property group, the first set of permissions indicating a respective particular degree of access to each of at least two types of patron information granted to the first property group on a first property group-wide basis, wherein the respective particular degree of access is one of multiple selectable degrees of access above no access and different permissions enable different types of patron information to be shared among the first plurality of gaming properties of the first property group on the first property group-wide basis;

generating by the at least one patron server a second set of permissions for the second property group, the second set of permissions indicating a respective particular degree of access to each of the at least two types of patron information granted to the second property group on a second property group-wide basis, wherein the respective particular degree of access is one of multiple selectable degrees of access above no access and different permissions enable different types of patron information to be shared among the second plurality of gaming properties of the second property group on the second property group-wide basis;

receiving by the at least one patron server patron information associated with at least one patron from an originating gaming property;

receiving by the at least one patron server a request for the patron information from a requesting gaming property, the requesting gaming property being different from the originating gaming property;

determining by the at least one patron server whether the first set of permissions applies to the request based at least in part on whether the first property group includes both of the originating gaming property and the requesting gaming property;

determining by the at least one patron server whether the second set of permissions applies to the request based at least in part on whether the second property group includes both of the originating gaming property and the requesting gaming property;

responsive to both of the first set of permissions and the second set of permissions applying to the request, determining by the at east one patron server whether the second set of permissions is less restrictive than the first set of permissions;

responsive to both of the first set of permissions and the second set of permissions applying to the request while the second set of permissions is less restrictive than the first set of permissions, verifying by the at least one patron server the request based at least in part on the second set of permissions; and responsive to verification of the request, transmitting by the at least one patron server the requested patron information to the requesting gaming property.

2. The method of claim 1, wherein logically associating the first plurality of gaming properties further comprises logically associating the first plurality of gaming properties in a database.

3. The method of claim 1, wherein logically associating the first plurality of gaming properties to create a first property group based at least in part on a first set of governmental laws that govern the first plurality of gaming properties further comprises logically associating the first plurality of gaming properties based at least in part on geographical locations of the first plurality of gaming properties.

4. The method of claim 1, wherein logically associating the first plurality of gaming properties to create a first property group based at least in part on a first set of governmental laws that govern the first plurality of gaming properties further comprises logically associating the first plurality of gaming properties based at least in part on laws associated with a jurisdictional entity that governs the first plurality of gaming properties.

5. The method of claim 1, further comprising storing the set of permissions in a remote database hosted at a remote server located apart from any of the first plurality of gaming properties.

6. The method of claim 1, wherein the requested patron information includes information indicative of at least one of: an incentive cash balance, a patron bonus, a patron identifier, a patron cash account balance, a marker payment, a front money balance, or a chip purchase voucher.

7. The method of claim 6, wherein the requested patron information includes information indicative of the patron identifier and the patron identifier comprises a patron account number and an identifier associated with the originating gaming property.

8. The method of claim 1, wherein generating by the at least one patron server a set of permissions for the first property group includes generating a first set of permissions that does not permit the first plurality of gaming properties in the first property group to share a first type of patron information and wherein generating the at least one patron server a second set of permissions for the second property group includes generating a second less restrictive set of permissions that permits the second plurality of gaming properties in the second property group to share the first type of patron information, the less restrictive second set of permissions determining the distribution of patron information for the second property group on the second property group-wide basis.

9. The method of claim 8, further comprising:

responsive to the requested patron information being the first type of patron information while the first property group includes the requesting gaming property and while the second property group includes the originating gaming property but not the requesting gaming property, sending by the at least one patron server an indication to at least one of the originating gaming property or requesting gaming property that the requested patron information may not be shared with the first property group.

10. The method of claim 1, wherein the at least two types of patron information include at least two selected from the following types: financial information, promotional information, personal information, historical preferences, or marketing information.

11. A non-transitory computer-readable medium that stores instructions that cause at least one processor to distribute patron information, by:

logically associating by the at least one processor in at least one database a first plurality of gaming properties to create a first property group in the at least one database based at least in part on a first set of governmental laws that govern the first plurality of gaming properties, each the first plurality of gaming properties is a respective tangible property where at least one patron at the respective tangible property engages in at least one form of at least one of gaming or gambling;

logically associating by the at least one processor a second plurality of gaming properties to create a second property group based at least in part on a second set of governmental laws that govern the second plurality of gaming properties, the second plurality of gaming properties different from the first plurality of gaming properties, each of the second plurality of gaming properties is a respective one of the first plurality of gaming properties that are respective tangible properties;

generating by the at least one processor a first set of permissions for the first property group, the first set of permissions indicating a respective particular degree of access to each of at least two types of patron information granted to the first property group on a first property group-wide basis, wherein the respective particular degree of access is one of multiple selectable degrees of access above no access and different permissions enable different types of patron information to be shared among the gaming properties of the first property group on the first property group-wide basis;

generating by the at least one processor a second set of permissions for the second property group, the second set of permissions indicating a respective particular degree of access to each of at least two types of patron information granted to the second property group on a second property group-wide basis, wherein the respective particular degree of access is one of multiple selectable degrees of access above no access and different permissions enable different types of patron information to be shared among the second plurality of gaming properties of the second property group on the second property group-wide basis;

receiving patron information associated with at least one patron from an originating gaming property;

receiving a request for the patron information from a requesting gaming property, the requesting gaming property being different from the originating gaming property;

determining by the at least one processor whether the first set of permissions applies to the request based at least in part on whether the first property group includes both of the originating gaming property and the requesting gaming property;

determining by the at least one processor whether the second set of permissions applies to the request based at least in part on whether the second property group includes both of the originating gaming property and the requesting gaming property;

responsive to both of the first set of permissions and the second set of permissions applying to the request, determining by the at least one processor whether the second set of permissions is less restrictive than the first set of permissions;

responsive to both of the first set of permissions and the second set of permissions applying to the request while the second set of permissions is less restrictive than the first set of permissions, verifying the request based at least in part on the second set of permissions; and responsive to verification of the request, transmitting the patron information to the requesting gaming property.

12. The non-transitory computer-readable medium of claim 11, wherein logically associating the first plurality of gaming properties to create a first property group based at least in part on a first set of governmental laws that govern the first plurality of gaming properties comprises logically associating the first plurality of gaming properties based at least in part on geographical locations of the first plurality of gaming properties.

13. The non-transitory computer-readable medium of claim 11, wherein logically associating the first plurality of gaming properties to create a first property group based at least in part on a first set of governmental laws that govern the first plurality of gaming properties comprises logically associating the first plurality of gaming properties based at least in part on laws associated with a jurisdictional entity that governs the first plurality of gaming properties.

14. The non-transitory computer-readable medium of claim 11, where the instructions cause the processor to distribute patron information further by: storing the set of permissions in a remote database hosted at a remote server located apart from any of the first plurality of gaming properties.

15. The non-transitory computer-readable medium of claim 11, wherein the patron information includes information indicative of at least one of: an incentive cash balance, a patron bonus, a patron identifier, a patron cash account balance, a marker payment, a front money balance, or a chip purchase voucher.

16. The non-transitory computer-readable medium of claim 15, wherein the patron identifier comprises a patron account number and an identifier associated with the originating gaming property.

17. The non-transitory computer-readable medium of claim 11, wherein generating by the at least one processor a set of permissions for the first property group includes generating a first set of permissions that does not permit the first plurality of gaming properties in the first property group to share a first type of patron information and wherein generating by the at least one processor a second set of permissions for the second property group includes generating a second less restrictive set of permissions that permits the second plurality of gaming properties in the second property group to share the first type of patron information, the less restrictive second set of permissions determining the distribution of patron information for the second property group on the second property group-wide basis.

18. The non-transitory computer-readable medium of claim 17, further comprising:

responsive to the requested patron information being the first type of patron information while the first property group includes the requesting gaming property and while the second property group includes the originating gaming property but not the requesting gaming property, sending an indication to at least one of the originating gaming property or requesting gaming property that the requested patron information may not be shared with the first property group.

19. The non-transitory computer-readable medium of claim 17, wherein the at least two types of patron information include at least two types selected from the following group of types: financial information, promotional information, personal information, historical preferences, or marketing information.

* * * * *